(12) United States Patent
Kanno et al.

(10) Patent No.: US 11,543,997 B2
(45) Date of Patent: *Jan. 3, 2023

(54) MEMORY SYSTEM AND METHOD FOR CONTROLLING NONVOLATILE MEMORY

(71) Applicant: Kioxia Corporation, Tokyo (JP)

(72) Inventors: Shinichi Kanno, Ota (JP); Hideki Yoshida, Yokohama (JP); Naoki Esaka, Kawasaki (JP); Hiroshi Nishimura, Hachioji (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,619

(22) Filed: Aug. 19, 2021

(65) Prior Publication Data
US 2021/0382648 A1 Dec. 9, 2021

Related U.S. Application Data

(63) Continuation of application No. 16/928,422, filed on Jul. 14, 2020, now Pat. No. 11,150,835, which is a (Continued)

(30) Foreign Application Priority Data

Apr. 25, 2018 (JP) .............................. JP2018-083662

(51) Int. Cl.
*G06F 3/06* (2006.01)
*G06F 12/1009* (2016.01)

(52) U.S. Cl.
CPC ............ *G06F 3/0656* (2013.01); *G06F 3/061* (2013.01); *G06F 3/064* (2013.01); *G06F 3/0679* (2013.01); *G06F 12/1009* (2013.01)

(58) Field of Classification Search
None
See application file for complete search history.

(56) References Cited

U.S. PATENT DOCUMENTS 8,595,411 B2 11/2013 Selinger et al.
8,717,842 B2 * 5/2014 Suzuki .................. G11C 11/406
365/189.04

(Continued)

FOREIGN PATENT DOCUMENTS

JP 2012-128660 A 7/2012
JP 5296041 9/2013

(Continued)

OTHER PUBLICATIONS

Yiying Zhang et al., "De-indirection for Flash-based SSDs with Nameless Writes", 10th USENIX Conference on File and Storage Technologies (FAST'12), Feb. 14-17, 2012, pp. 1-16, downloaded on Sep. 13, 2017 from: https://www.usenix.org/system/files/conference/fast12/zhang.pdf.

*Primary Examiner* — Michael Sun
(74) *Attorney, Agent, or Firm* — Oblon, McClelland, Maier & Neustadt, L.L.P.

(57) ABSTRACT

According to one embodiment, a memory system includes a nonvolatile memory and a controller. The controller acquires, from a host, write data having the same first size as a data write unit of the nonvolatile memory and obtained by dividing write data associated with one write command having a first identifier indicating a first write destination block in a plurality of write destination blocks into a plurality of write data or combining write data associated with two or more write commands having the first identifier. The controller writes the acquired write data having the first size to the first write destination block by a first write operation.

20 Claims, 21 Drawing Sheets

Related U.S. Application Data continuation of application No. 16/351,993, filed on Mar. 13, 2019, now Pat. No. 10,761,771.

(56) References Cited

U.S. PATENT DOCUMENTS

| | | | |
|---|---|---|---|
| 8,924,629 | B1 | 12/2014 | Call |
| 9,087,614 | B2 | 7/2015 | Son |
| 9,158,617 | B2 | 10/2015 | Cho |
| 10,133,666 | B2 * | 11/2018 | Wei ............ G06F 16/13 |
| 2008/0022163 | A1 | 1/2008 | Tanaka |
| 2010/0131805 | A1 | 5/2010 | Katsuragi |
| 2010/0199025 | A1 * | 8/2010 | Nanjou ............ G06F 12/0246 |
| | | | 711/158 |
| 2010/0262777 | A1 | 10/2010 | Kaga |
| 2012/0072641 | A1 | 3/2012 | Suzuki |
| 2013/0191705 | A1 | 7/2013 | Watanabe et al. |
| 2013/0212319 | A1 | 8/2013 | Hida et al. |
| 2014/0189206 | A1 * | 7/2014 | Sinclair ............ G06F 12/0246 |
| | | | 711/103 |
| 2014/0192583 | A1 | 7/2014 | Rajan |
| 2014/0195722 | A1 | 7/2014 | Tatara |
| 2015/0121021 | A1 | 4/2015 | Nakamura |
| 2015/0127886 | A1 | 5/2015 | Kanno |
| 2015/0234598 | A1 | 8/2015 | Fujimoto |
| 2016/0259687 | A1 | 9/2016 | Yoshihara |
| 2016/0266827 | A1 | 9/2016 | Hasegawa et al. |
| 2017/0262228 | A1 | 9/2017 | Kanno |
| 2018/0004416 | A1 | 1/2018 | Okita |
| 2019/0205207 | A1 | 7/2019 | Suzuki |
| 2019/0369921 | A1 * | 12/2019 | Oh ............ G06F 11/1068 |

FOREIGN PATENT DOCUMENTS

| | | |
|---|---|---|
| JP | 2015-88121 A | 5/2015 |
| JP | 2016-170696 | 9/2016 |
| JP | 2017-162068 A | 9/2017 |

* cited by examiner

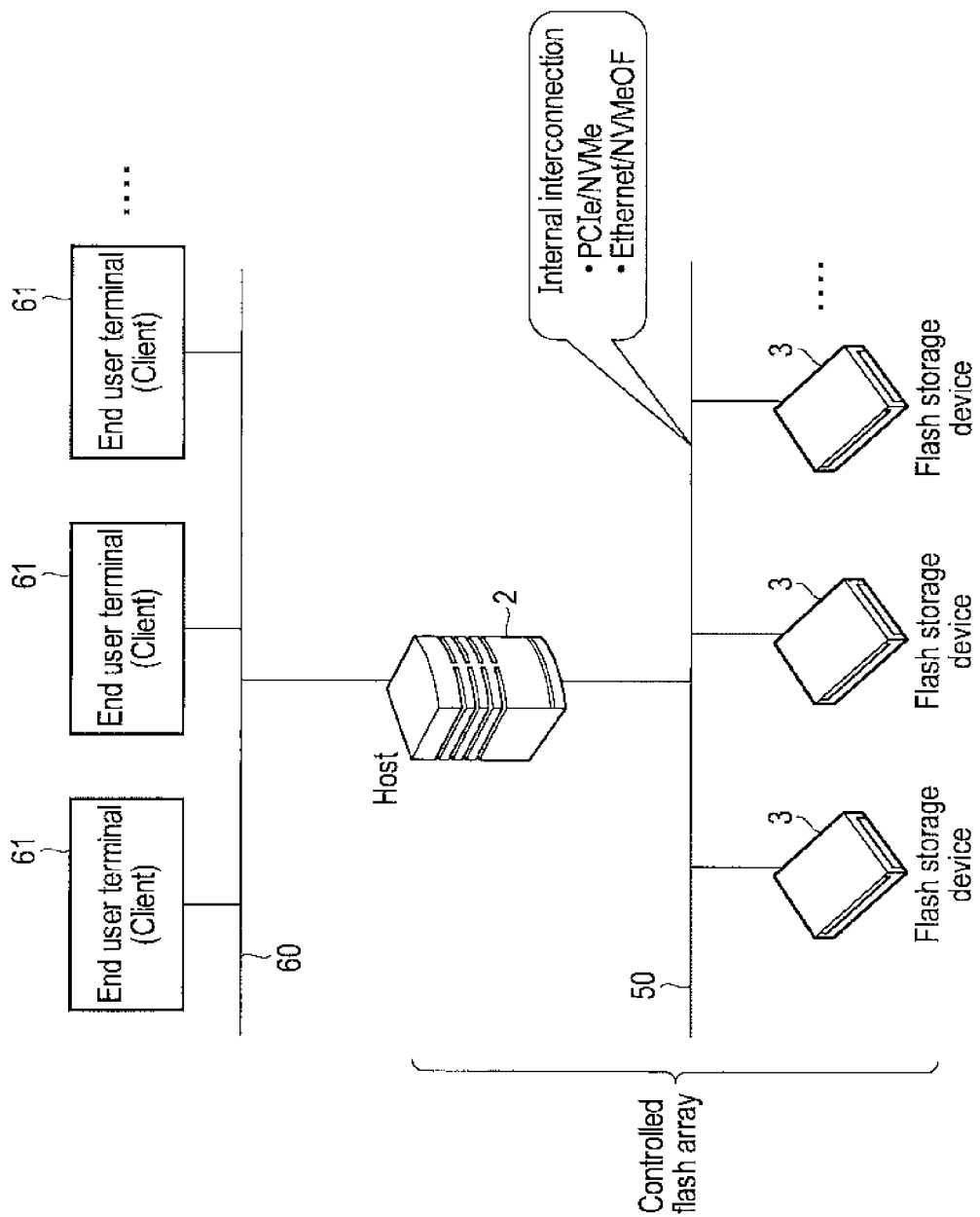
F I G. 1

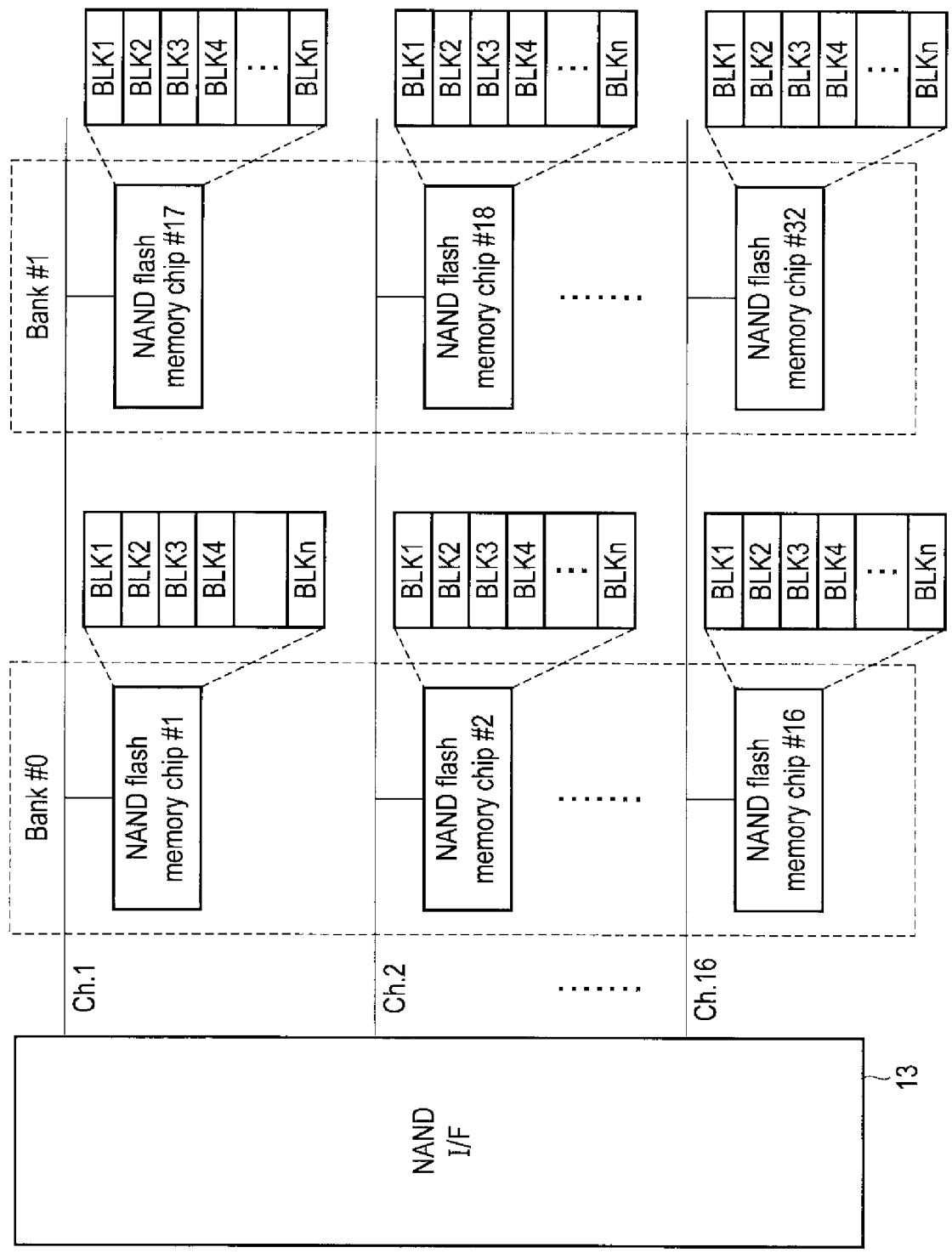
F I G. 3

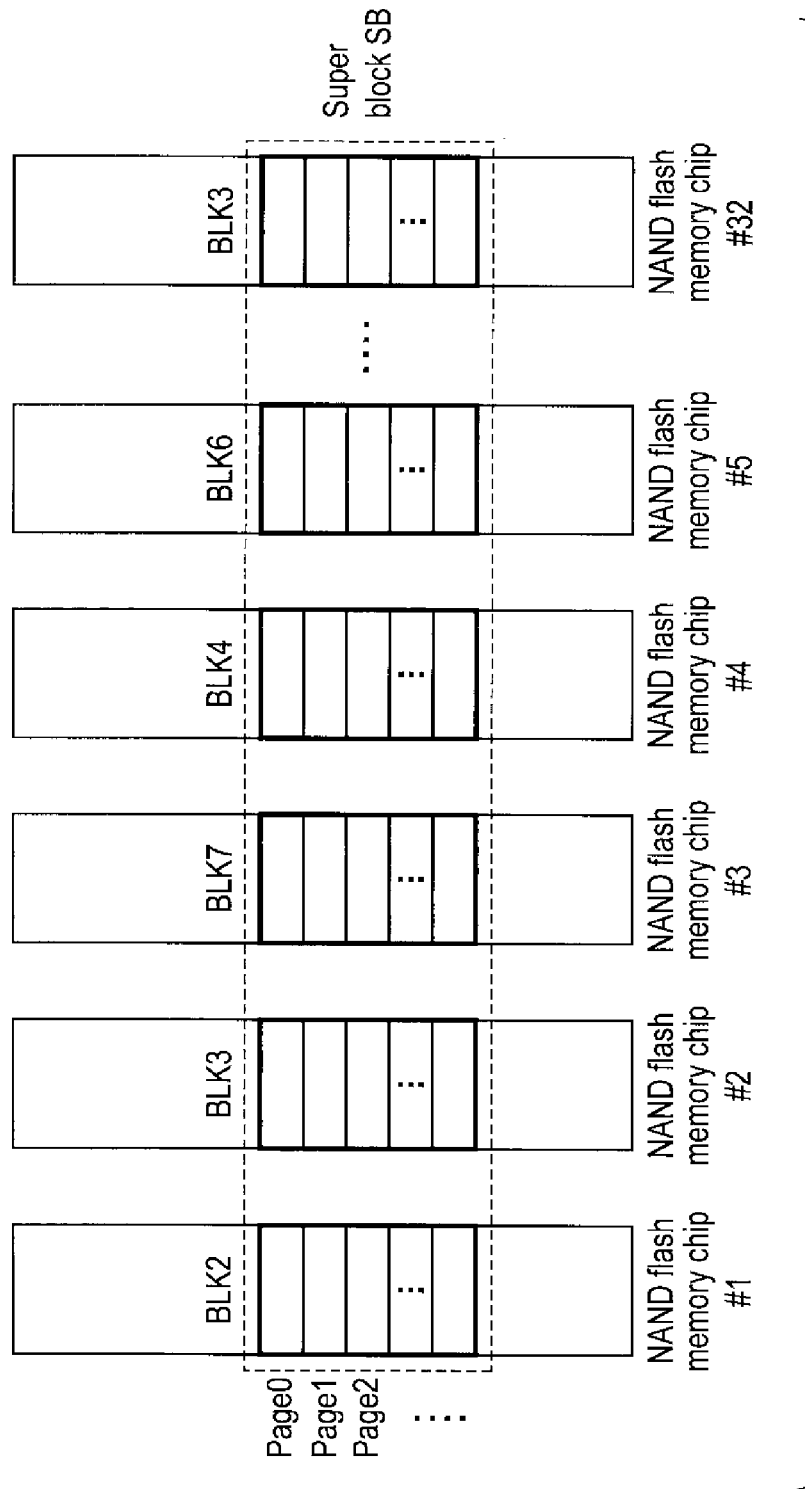
F I G. 4

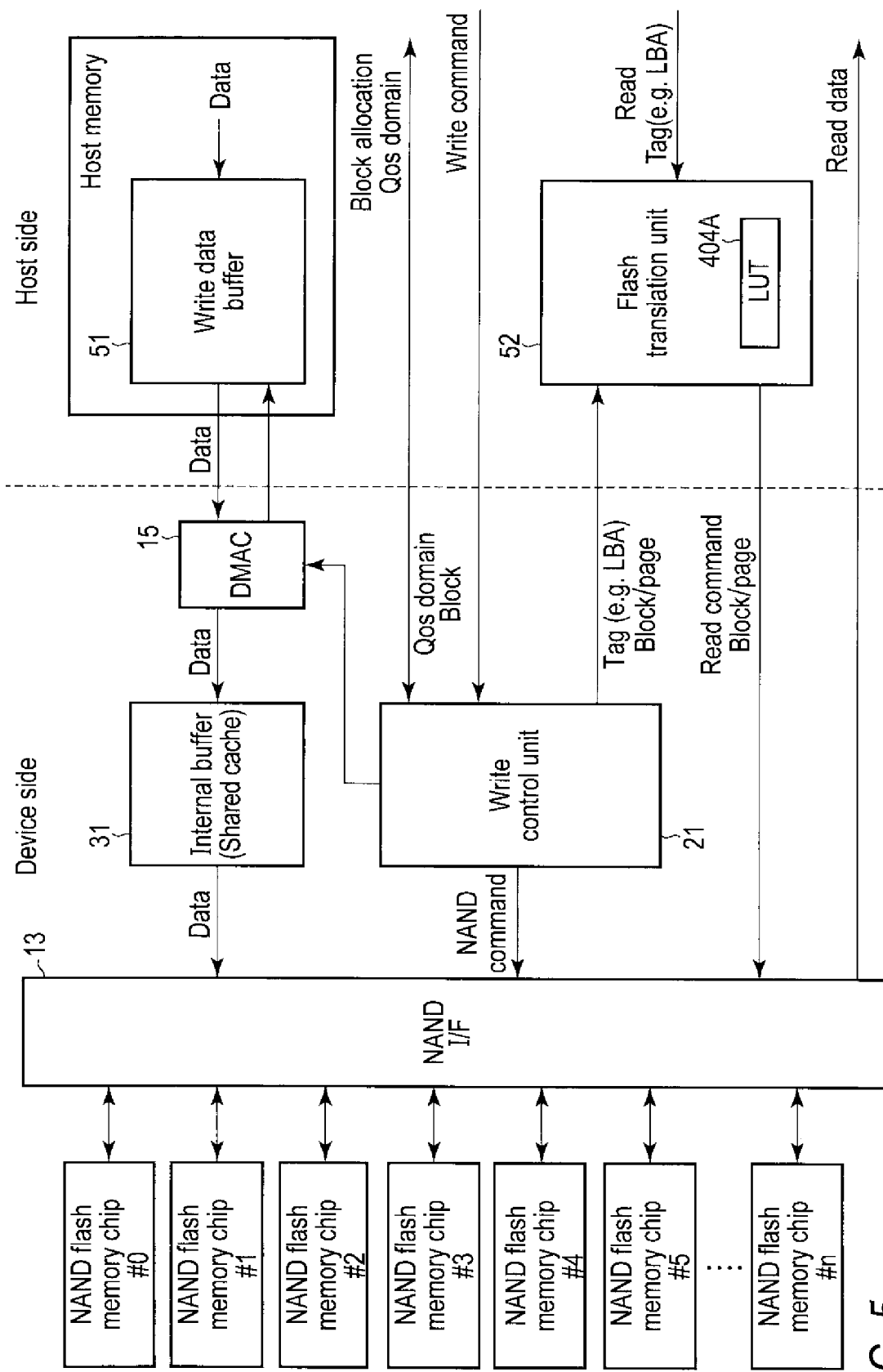
F I G. 5

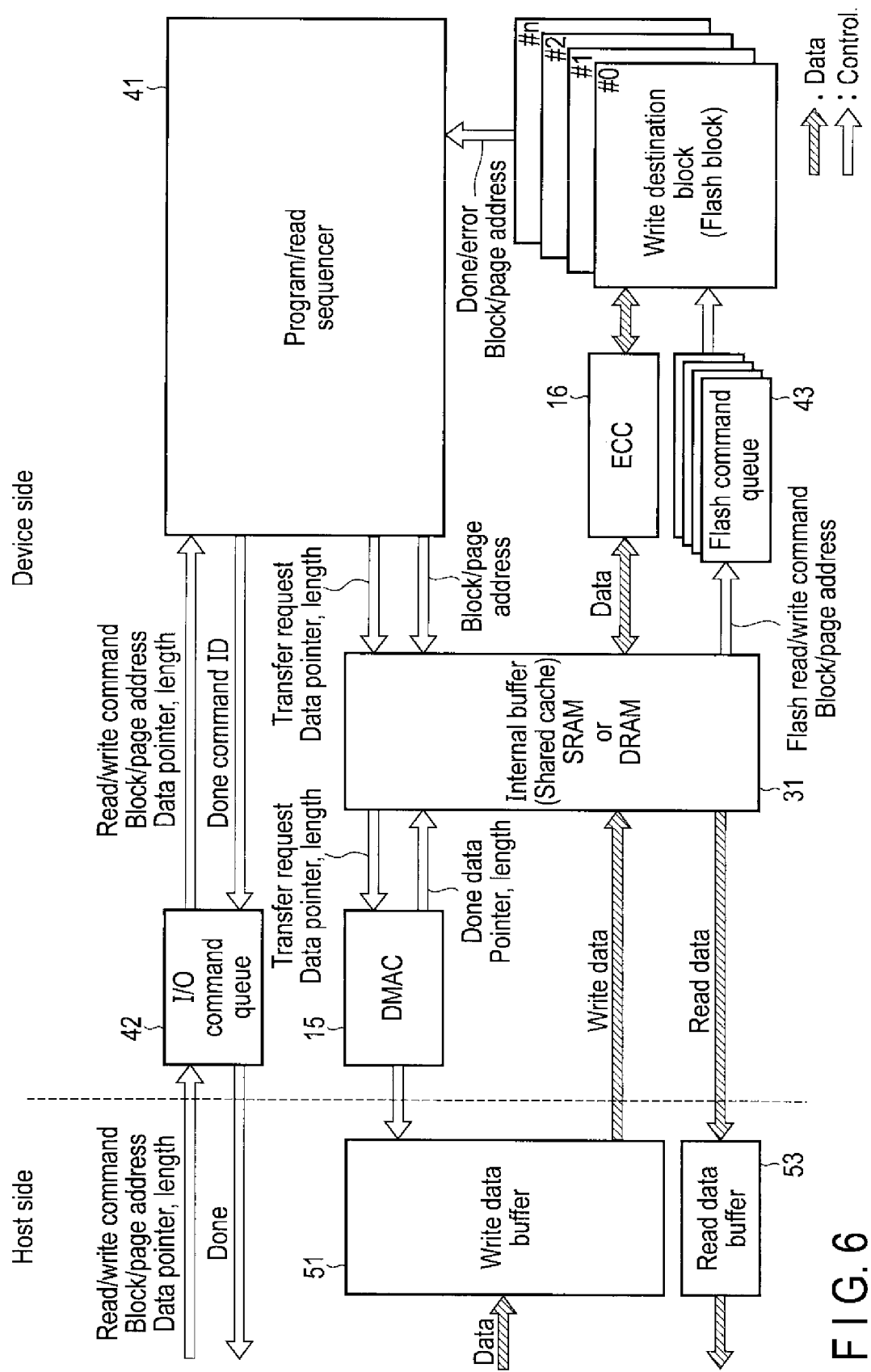
F I G. 6

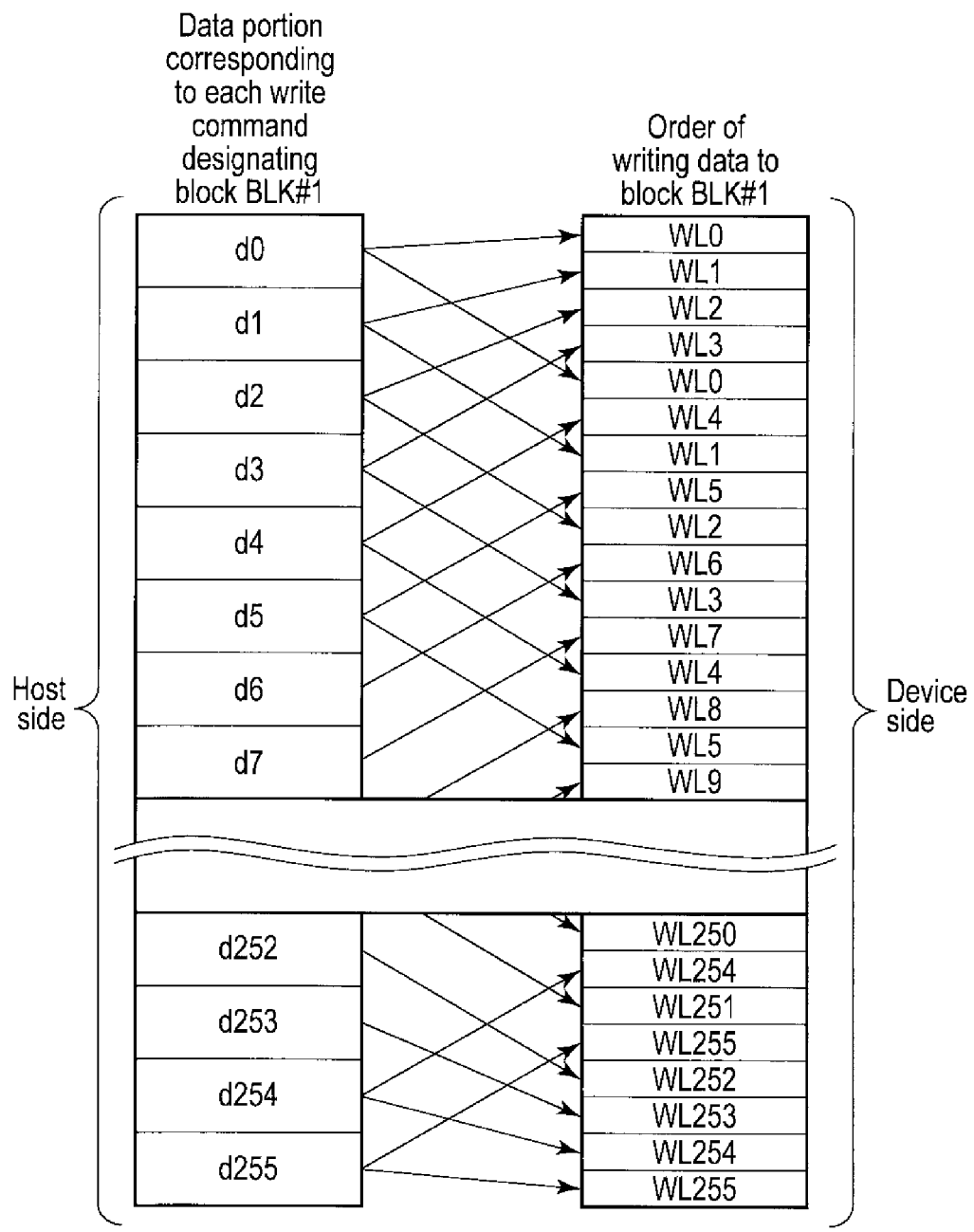
F I G. 8

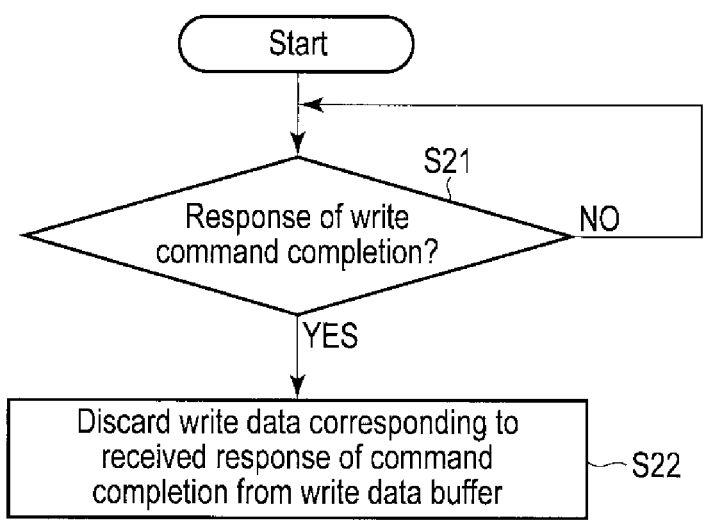
F I G. 11

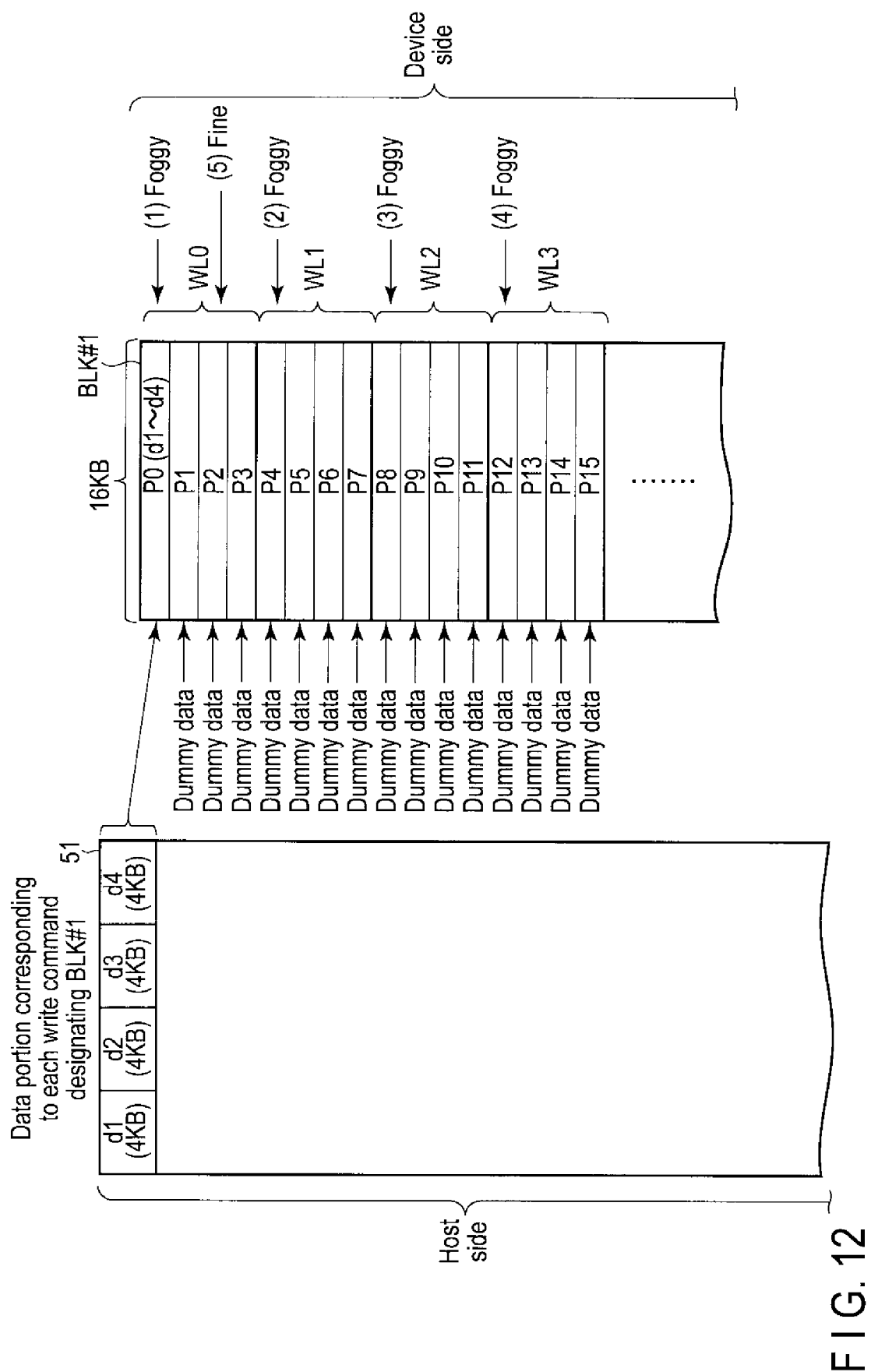
F I G. 12

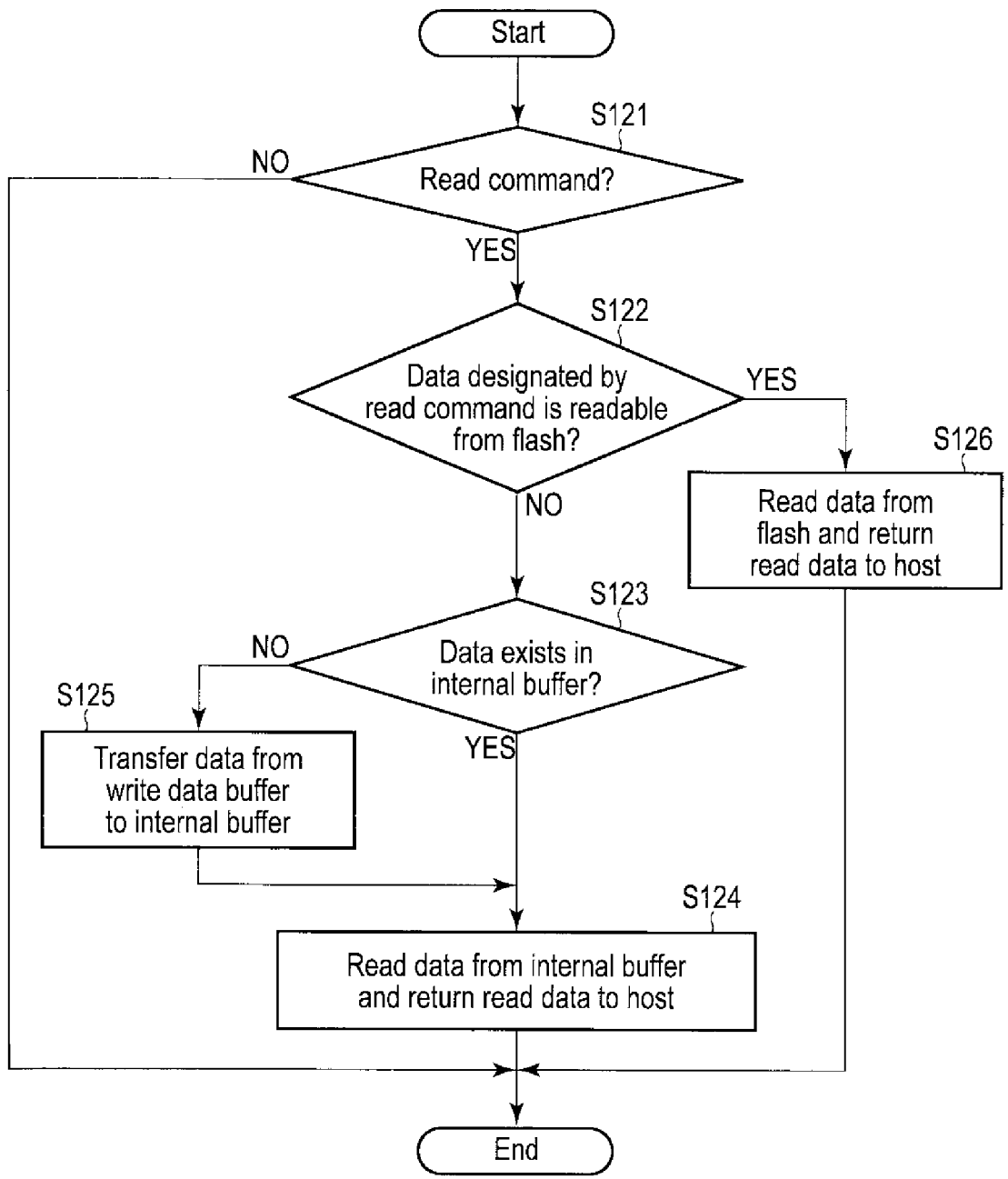
F I G. 18

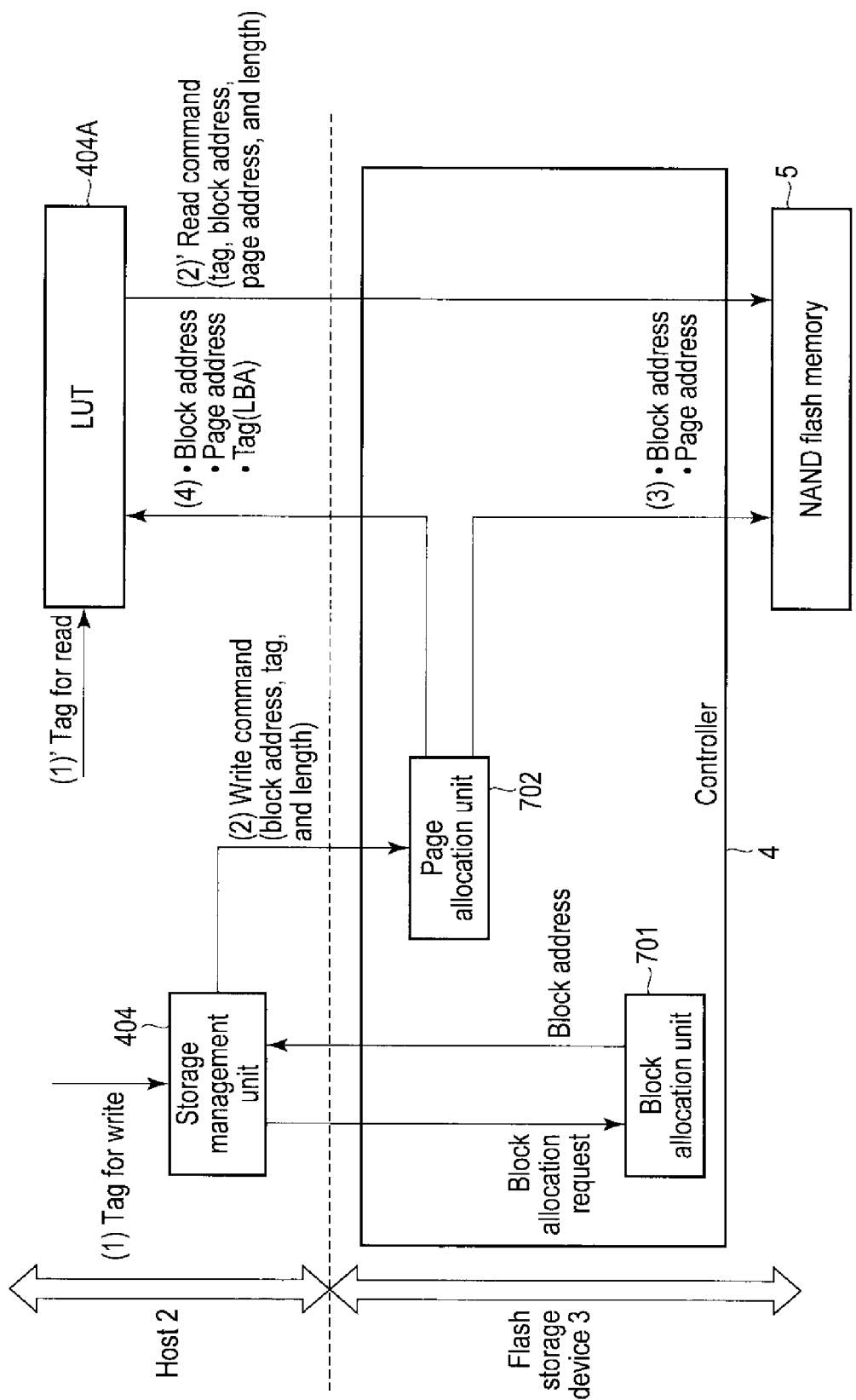
F I G. 19

Block allocation command

| | Description |
|---|---|
| Command ID | Command ID for block allocation |
| | Host requests device to allocate free block, thereby acquiring block address from device |

F I G. 20

Response to block allocation command

| | Description |
|---|---|
| Block address | Device selects block to be allocated to host from free block list and returns block address of selected block to host |

F I G. 21

Write command

| | Explanation |
|---|---|
| Command ID | Command ID for write command |
| Block address | Physical address designating block where data is to be written |
| Tag | Identifier of data to be written |
| Length | Length of data to be written |

F I G. 22

Response to write command

| | Explanation |
|---|---|
| Page address | Physical address designating page where data is written |
| Length | Length of written data |

FIG. 23

Read command

| | Explanation |
|---|---|
| Command ID | Command ID for read command |
| Tag | Identifier of data to be read |
| Block address | Designate block where data to be read is stored |
| Page address | Designate page where data to be read is stored |
| Length | Length of data to be read |

FIG. 24

MEMORY SYSTEM AND METHOD FOR CONTROLLING NONVOLATILE MEMORY

CROSS-REFERENCE TO RELATED APPLICATIONS

This application is a continuation of U.S. application Ser. No. 16/928,422 filed Jul. 14, 2020, which is a continuation of U.S. application Ser. No. 16/351,993 filed Mar. 13, 2019, which is based upon and claims the benefit of priority from Japanese Patent Application No. 2018-083662, filed Apr. 25, 2018, the entire contents of each of which are incorporated herein by reference.

FIELD

Embodiments described herein relate generally to a technology for controlling a nonvolatile memory.

BACKGROUND

Recently, memory systems including nonvolatile memories are widely spread. As one of these memory systems, a solid state drive (SSD) based on NAND flash technology is known.

Even in a server of a data center, the SSD is used as a storage device.

High I/O performance is required in a storage device used in a host (host computing system) such as the server.

Therefore, recently, a new interface between the host and the storage device starts to be proposed.

Further, in recent storage devices, it may be required to enable different types of data to be written to different write destination blocks.

For this reason, it is required to realize new technology for enabling a plurality of write destination blocks to be simultaneously used.

BRIEF DESCRIPTION OF THE DRAWINGS

FIG. 1 is a block diagram illustrating a relation between a host and a memory system (flash storage device) according to an embodiment.

FIG. 3 is a block diagram illustrating a relation between a plurality of channels and a plurality of NAND flash memory chips, which are used in the memory system according to the embodiment.

FIG. 4 is a diagram illustrating a configuration example of a certain super block used in the memory system according to the embodiment.

FIG. 5 is a block diagram illustrating a relation between a write data buffer and a flash translation unit included in the host and a write control unit, a DMAC, and an internal buffer included in the memory system according to the embodiment.

FIG. 6 is a block diagram illustrating I/O command processing executed by the memory system according to the embodiment.

FIG. 8 is a diagram illustrating order of writing data to a certain write destination block in the memory system according to the embodiment.

FIG. 11 is a flowchart illustrating a procedure of write data discard processing executed by the host.

FIG. 12 is a diagram illustrating dummy data write processing executed by the memory system according to the embodiment, when a next write command is not received for a threshold period after a latest write command is received.

FIG. 18 is a flowchart illustrating a procedure of data read processing executed by the memory system according to the embodiment.

FIG. 19 is a diagram illustrating data write processing in which the host designates a write destination block and the memory system according to the embodiment determines a write destination page and data read processing in which the host designates a block address and a page address.

FIG. 20 is a diagram illustrating a block allocation command (block allocation request) applied to the memory system according to the embodiment.

FIG. 21 is a diagram illustrating a response to the block allocation command.

FIG. 22 is a diagram illustrating a write command applied to the memory system according to the embodiment.

FIG. 23 is a diagram illustrating a response indicating command completion of the write command.

FIG. 24 is a diagram illustrating a read command applied to the memory system according to the embodiment.

DETAILED DESCRIPTION

Figure 2:
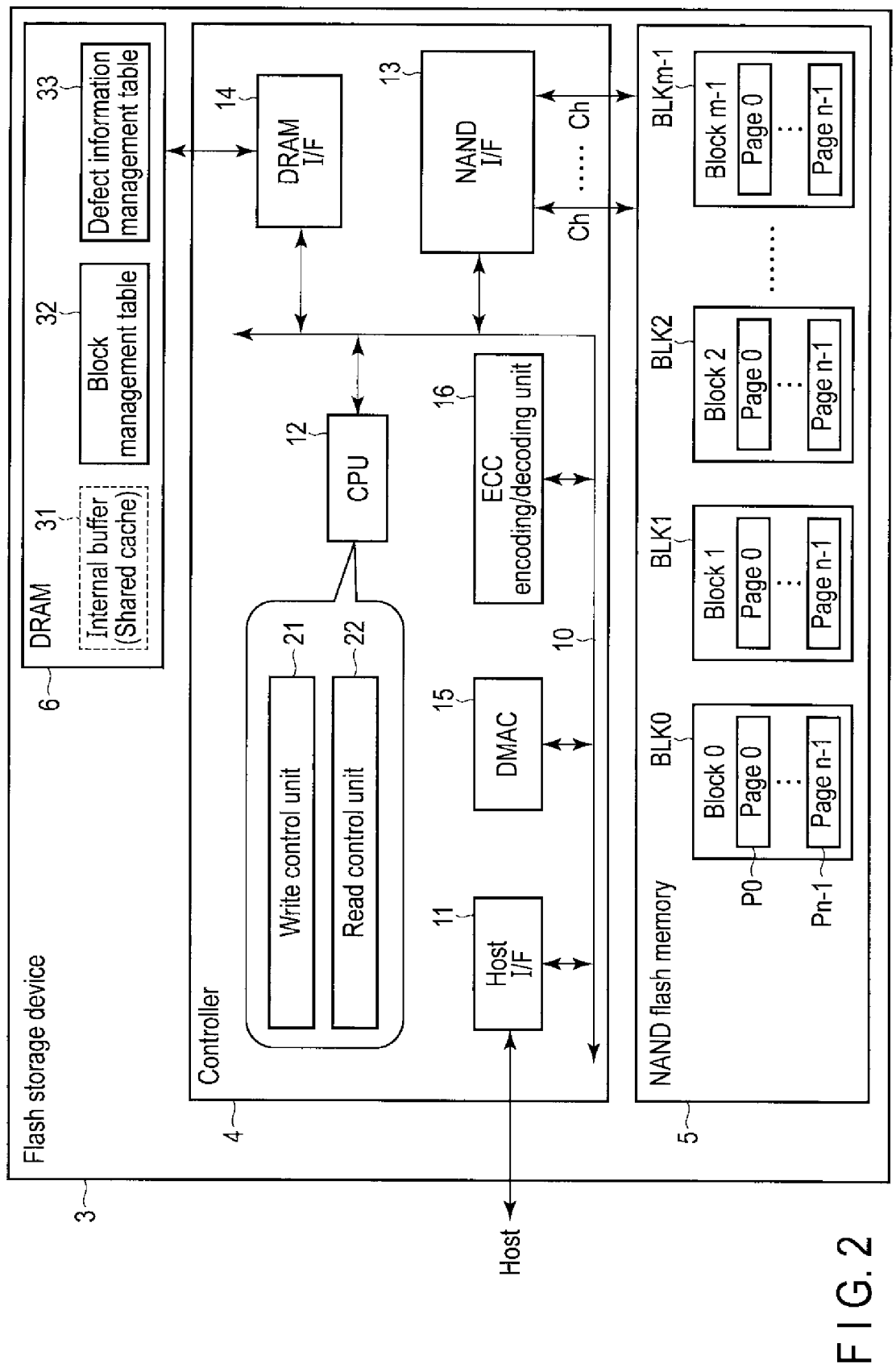
FIG. 2 is a block diagram illustrating a configuration example of the memory system according to the embodiment.

Various embodiments will be described hereinafter with reference to the accompanying drawings.

In general, according to one embodiment, a memory system connectable to a host includes a nonvolatile memory including a plurality of blocks and a controller electrically connected to the nonvolatile memory and configured to manage a plurality of write destination blocks allocated from the blocks, and execute a first write operation involving transferring same data to the nonvolatile memory once or more.

The controller receives, from the host, write commands each designating a location on a memory of the host where write data to be written exists, a length of the write data, and an identifier indicating a block where the write data is to be written.

After receiving one or more write commands having a first identifier indicating a first write destination block in the write destination blocks, the controller acquires, from the host, write data having the same first size as a data write unit of the nonvolatile memory and obtained by dividing write data associated with one write command in the write commands having the first identifier into a plurality of write data or combining write data associated with two or more write commands in the write commands having the first identifier. The controller writes the acquired write data having the first size to the first write destination block by the first write operation.

First, a relation between a memory system according to the present embodiment and a host will be described with reference to FIG. 1.

The memory system is a semiconductor storage device configured to write data to a nonvolatile memory and to read data from the nonvolatile memory. The memory system is realized as a flash storage device 3 based on NAND flash technology.

A host (host device) 2 is configured to control a plurality of flash storage devices 3. The host 2 is realized by an information processing apparatus configured to use a flash array including the flash storage devices 3 as a storage. The information processing apparatus may be a personal computer or a server computer.

The flash storage device 3 may be used as one of a plurality of storage devices provided in the storage array. The storage array may be connected to the information processing apparatus such as the server computer via a cable or a network. The storage array includes a controller that controls a plurality of storages (for example, the flash storage devices 3) in the storage array. When the flash storage device 3 is applied to the storage array, the controller of the storage array may function as a host of the flash storage device 3.

Hereinafter, the case where the information processing apparatus such as the server computer functions as the host 2 will be described by way of example.

The host (server) 2 and the flash storage devices 3 are interconnected via an interface 50 (internal interconnection). The interfaces 50 for the interconnection is not limited thereto and PCI Express (PCIe) (registered trademark), NVM Express (NVMe) (registered trademark), Ethernet (registered trademark), NVMe over Fabrics (NVMeOF), and the like can be used as the interface 50.

As a typical example of the server computer functioning as the host 2, there is a server computer (hereinafter, referred to as the server) in a data center.

In the case where the host 2 is realized by the server in the data center, the host (server) 2 may be connected to a plurality of end user terminals (clients) 61 via a network 60. The host 2 can provide various services to these end user terminals 61.

Examples of the services that can be provided by the host (server) 2 include (1) a platform as a service (PaaS) that provides a system running platform to each client (each end user terminal 61), (2) an infrastructure as a service (IaaS) that provides an infrastructure such as a virtual server to each client (each end user terminal 61), and the like.

A plurality of virtual machines may be executed on a physical server functioning as the host (server) 2. Each of the virtual machines running on the host (server) 2 can function as a virtual server configured to provide various services to the client (end user terminal 61) corresponding to the virtual machine. In each virtual machine, an operating system and a user application, which are used by the corresponding end user terminal 61, are executed. The operating system corresponding to each virtual machine includes an I/O service. The I/O service may be a block I/O service based on a logical block address (LBA) or a key-value store service. The I/O service may include an address translation table for managing the mapping between each of tags for identifying data to be accessed and each of physical addresses of the flash storage device 3. The tag may be a logical address such as the LBA or a key of a key-value store.

In the operating system corresponding to each virtual machine, the I/O service issues an I/O command (a write command and a read command) in response to a write/read request from the user application. The I/O command is sent to the flash storage device 3 via a command queue.

The flash storage device 3 includes a nonvolatile memory such as a NAND flash memory. The flash storage device 3 manages a plurality of write destination blocks allocated from a plurality of blocks in the nonvolatile memory. The write destination block means a block where data is to be written. The write command sent from the host 2 to the flash storage device 3 designates a location on a memory of the host 2 where write data to be written exists, a length of the write data, and an identifier indicating the block where the write data is to be written. Therefore, the host 2 can designate a specific write destination block where data is to be written. As a result, for example, the host 2 can realize data placement in which data of a user application corresponding to a certain end user terminal 61 (client) is written to one or more specific write destination blocks and data of a user application corresponding to another end user terminal 61 (client) is written to one or more other specific write destination blocks.

The identifier indicating the block where the write data is to be written may be represented by a block address (block number) designating a specific write destination block. In the case where the flash storage device 3 includes a plurality of NAND flash memory chips, the block address may be represented by a combination of a block address and a chip number.

In the case where the flash storage device 3 supports stream write, the identifier indicating the block where the write data is to be written may be an identifier (stream ID) of one stream in a plurality of streams. In the stream write, a plurality of write destination blocks are associated with a plurality of streams, respectively. In other words, when the flash storage device 3 receives a write command including a certain stream ID from the host 2, the flash storage device 3 writes data to a write destination block associated with a stream corresponding to the stream ID. When the flash storage device 3 receives a write command including another stream ID from the host 2, the flash storage device 3 writes data to another write destination block associated with another stream corresponding to another stream ID. In the flash storage device 3, a management table for managing the mapping between each od stream IDs and each of block addresses may be used.

The flash storage device 3 can be realized as any storage device among the following type #1-storage device, type #2-storage device, and type #3-storage device.

The type #1-storage device is a type of storage device in which the host 2 designates both a block where data is to be written and a page where the data is to be written. A write command to be applied to the type #1-storage device includes a block address, a page address, a data pointer, and a length. The block address designates a block where write data received from the host 2 is to be written. The page address designates a page in the block where the write data is to be written. The data pointer indicates a location on a memory in the host 2 where the write data exists. The length indicates a length of the write data.

The type #2-storage device is a type of storage device in which the host 2 designates a block where data is to be written and the storage device designates a location (page) in the block where the data is to be written. A write command to be applied to the type #2-storage device includes a tag (for example, an LBA or key) for identifying the write data to be written, a block address, a data pointer, and a length. Further, the write command may include a QoS domain ID. The QoS domain ID designates one of a plurality of regions obtained by logically dividing the NAND flash memory. Each of the regions includes a plurality of blocks. The type #2-storage device can determine a page where data is to be written, in consideration of bad pages and page write order restrictions.

That is, in the case where the flash storage device 3 is realized as the type #2-storage device, the flash storage device 3 hides page write order restrictions, bad pages, page sizes, and the like while causing the host 2 to handle the block. As a result, the host 2 can recognize a block boundary and can manage which user data exists in which block without being conscious of the page write order restrictions, the bad pages, and the page sizes.

The type #3-storage device is a type of storage device in which the host 2 designates a tag (for example, an LBA) for identifying data and the storage device determines both a block and a page where the data is to be written. A write command to be applied to the type #3-storage device includes a tag (for example, an LBA or key) for identifying the write data to be written, a stream ID, a data pointer, and a length. The stream ID is an identifier of a stream associated with the write data. In the case where the flash storage device 3 is realized as the type #3-storage device, the flash storage device 3 refers to a management table for managing the mapping between each of stream IDs and each of block addresses and determines a block where the write data is to be written. Further, the flash storage device 3 manages the mapping between each of tags (LBAs) and each of physical addresses of the NAND flash memory by using an address translation table called a logical-to-physical address translation table.

The flash storage device 3 may be any one of the type #1-storage device, the type #2-storage device, and the type #3-storage device. However, the flash storage device 3 manages a plurality of write destination blocks allocated from a plurality of blocks included in the NAND flash memory and writes write data associated with a certain write command to a write destination block designated by the write command.

In the type #1-storage device, page write order in the write destination block is designated by the host 2. Therefore, in the case where the flash storage device 3 is realized as the type #1-storage device, the flash storage device 3 writes data to each page in the write destination block in the order corresponding to the page address designated by each write command from the host 2.

In the type #2-storage device, the write destination block is designated by the block address included in the write command from the host 2. However, the write destination page in the write destination block is determined by the flash storage device 3. Therefore, in the case where the flash storage device 3 is realized as the type #2-storage device, the flash storage device 3 determines the write destination page so that data is written in order of a first page to a final page of the write destination block designated by the block address included in the write command.

In the type #3-storage device, the flash storage device 3 selects the block associated with the stream ID included in the write command as the write destination block and determines the write destination page in the write destination block. Therefore, in the case where the flash storage device 3 is realized as the type #3-storage device, the flash storage device 3 determines the write destination page so that data is written in order of a first page to a final page of the write destination block, for example.

The write destination blocks managed by the flash storage device 3 can be used by a plurality of end users (clients) sharing the flash storage device 3, respectively. In this case, in the flash storage device 3, the write destination blocks of which the number is equal to or larger than the number of end users sharing the flash storage device 3 are simultaneously opened.

FIG. 2 illustrates a configuration example of the flash storage device 3.

The flash storage device 3 includes a controller 4 and a nonvolatile memory (NAND flash memory) 5. Further, the flash storage device 3 may include a random access memory, for example, a DRAM 6.

The NAND flash memory 5 includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 includes a plurality of pages (in this case, pages P0 to Pn−1). The blocks BLK0 to BLKm−1 function as erase units. A block may also be referred to as an "erase block", a "physical block", or a "physical erase block". The pages P0 to Pn−1 are units of a data write operation and a data read operation.

The controller 4 is electrically connected to the NAND flash memory 5 to be the nonvolatile memory via a NAND interface 13 such as a Toggle NAND flash interface and an open NAND flash interface (ONFI). The controller 4 operates as a memory controller configured to control the NAND flash memory 5. The controller 4 may be realized by a circuit such as a system-on-a-chip (SoC).

As illustrated in FIG. 3, the NAND flash memory 5 may include a plurality of NAND flash memory chips (NAND flash memory dies). Each of the NAND flash memory chips can operate independently. Therefore, the NAND flash memory chip functions as a unit in which a parallel operation is enabled. In FIG. 3, the case where 16 channels Ch.1 to Ch.16 are connected to the NAND interface 13 and two NAND flash memory chips are connected to each of the 16 channels Ch.1 to Ch.16 is exemplified. In this case, 16 NAND flash memory chips #1 to #16 connected to the channels Ch.1 to Ch.16 may be organized as a bank #0 and the remaining 16 NAND flash memory chips #17 to #32 connected to the channels Ch.1 to Ch.16 may be organized as a bank #1. The bank functions as a unit for operating a plurality of memory modules in parallel by bank interleaving. In the configuration example of FIG. 3, a maximum of 32 NAND flash memory chips can be operated in parallel by the 16 channels and the bank interleaving using the two banks.

An erase operation may be executed in a unit of one block (physical block) or may be executed in a unit of a parallel unit (super block) including a set of physical blocks that can operate in parallel. One parallel unit, that is, one super block including the set of physical blocks is not limited thereto and may include a total of 32 physical blocks selected one by one from the NAND flash memory chips #1 to #32. Each of the NAND flash memory chips #1 to #32 may have a multi-plane configuration. For example, in the case where each of the NAND flash memory chips #1 to #32 has a multi-plane configuration including two planes, one super block may include a total of 64 physical blocks selected one by one from 64 planes corresponding to the NAND flash memory chips #1 to #32.

In FIG. 4, one super block (SB) including 32 physical blocks (in this case, a physical block BLK2 in the NAND flash memory chip #1, a physical block BLK3 in the NAND flash memory chip #2, a physical block BLK7 in the NAND flash memory chip #3, a physical block BLK4 in the NAND flash memory chip #4, a physical block BLK6 in the NAND flash memory chip #5, . . . , and a physical block BLK3 in the NAND flash memory chip #32) is exemplified.

The write destination block may be one physical block or one super block. A configuration where one super block includes only one physical block may be used. In this case, one super block is equivalent to one physical block.

Next, a configuration of the controller 4 of FIG. 2 will be described.

The controller 4 includes a host interface 11, a CPU 12, a NAND interface 13, a DRAM interface 14, a direct memory access controller (DMAC) 15, an ECC encoding/decoding unit 16, and the like. The host interface 11, the CPU 12, the NAND interface 13, the DRAM interface 14, the DMAC 15, and the ECC encoding/decoding unit 16 are interconnected via the bus 10.

The host interface 11 is a host interface circuit configured to execute communication with the host 2.

The host interface 11 may be, for example, a PCIe controller (NVMe controller). Alternatively, in a configuration in which the flash storage device 3 is connected to the host 2 via Ethernet (registered trademark), the host interface 11 may be an NVMe over Fabrics (NVMeOF) controller.

The host interface 11 receives various commands from the host 2. These commands include a write command, a read command, and various other commands.

The CPU 12 is a processor configured to control the host interface 11, the NAND interface 13, and the DRAM interface 14. In response to power-on of the flash storage device 3, the CPU 12 loads a control program (firmware) from the NAND flash memory 5 or a ROM (not illustrated in the drawings) onto the DRAM 6 and executes various processing by executing the firmware. The firmware may be loaded on an SRAM (not illustrated in the drawings) in the controller 4. The CPU 12 can execute command processing for processing the various commands from the host 2. An operation of the CPU 12 is controlled by the firmware executed by the CPU 12. A part or all of the command processing may be executed by dedicated hardware in the controller 4.

The CPU 12 can function as a write control unit 21 and a read control unit 22. A part or all of each of the write control unit 21 and the read control unit 22 may also be realized by the dedicated hardware in the controller 4.

The write control unit 21 manages the write destination blocks allocated from the blocks of the NAND flash memory 5. In many modern NAND flash memories, complicated write operations are often executed to reduce program disturb. For this reason, in the many modern NAND flash memories, even if data is written to a certain page in the block, the data written to this page cannot be normally read immediately after writing the data, and after completion of writing of data to one or more pages subsequent to this page, the data may be read from this page.

Further, in the modern NAND flash memories, a multi-step write operation involving transferring the same write data to the NAND flash memory multiple times is also applied. An example of the multi-step write operation is a foggy-fine write operation.

The multi-step write operation includes at least a first write operation step such as a foggy write operation and a second write operation step such as a fine write operation. The foggy write operation is a write operation for roughly setting a threshold distribution of each memory cell and the fine write operation is a write operation for adjusting the threshold distribution of each memory cell.

Furthermore, an intermediate write operation may be executed between the foggy write operation and the fine write operation.

The write control unit 21 may write the write data to the write destination block by a write operation (multi-step write operation) involving transferring the same write data to the NAND flash memory 5 multiple times like the foggy-fine write operation or may write the write data to the write destination block by a write operation involving transferring the write data to the NAND flash memory 5 once like a full-sequence write operation or other various write operations.

The write control unit 21 receives each write command from the host 2. Each write command designates a location on the memory of the host 2 where write data to be written exists, a length of the write data, and an identifier indicating a block where the write data is to be written.

The length of the write data is different for each write command. For example, a certain write command may request writing of large-sized write data of, for example, about 1 Mbyte and another write command may request writing of small-sized write data of, for example, about 4 Kbytes. Therefore, if a method in which the flash storage device 3 simply transfers the write data of the size designated by each write command from the host 2 to an internal buffer of the flash storage device 3 is used, the internal buffer may be occupied by large-sized write data to be written to a specific write destination block for a long time and a data write operation for each of the other write destination blocks may not be executed. As a result, it becomes difficult to simultaneously use a plurality of write destination blocks.

Therefore, the write control unit 21 acquires the write data from the host 2 in a unit of the same data size as the data write unit of the NAND flash memory 5, regardless of the size designated by each write command. The data write unit of the NAND flash memory 5 means a data transfer size for writing data to the NAND flash memory 5. A typical example of the data write unit of the NAND flash memory 5 is a page size (for example, 16 Kbytes). Alternatively, a data size (size multiple times as large as the page size) corresponding to a plurality of pages may be used as the data write unit.

When a size of write data associated with a write command designating a certain write destination block is smaller than the data write unit of the NAND flash memory 5, the write control unit 21 waits for a next write command designating the write destination block. When a total size of some write data associated with some write commands designating the write destination block becomes equal to or larger than the data write unit of the NAND flash memory 5, the write control unit 21 acquires, from the host 2, data of the same size as the data write unit of the NAND flash memory 5 that is obtained by combining the write data. For example, in the case where four write commands designating the same write destination block request writing of four write data each having 4 Kbytes, respectively, the write control unit 21 may acquire, from the host 2, write data of 16 Kbytes obtained by combining the four write data of 4 Kbytes with each other. In this case, the write control unit 21 may sequentially acquire the four write data of 4 Kbytes from the host 2 by four DMA transfers. The write control unit 21 transfers the acquired write data having the same size as the data write unit of the NAND flash memory 5 to the NAND flash memory 5 and writes the write data to the write destination block of the NAND flash memory 5.

On the other hand, when a size of write data associated with a write command designating a certain write destination block is larger than the data write unit of the NAND flash memory 5, the write control unit 21 obtains one or more write data having the same size as the data write unit, obtained by dividing the write data into a plurality of write data (a plurality of data portions). In addition, the write control unit 21 acquires the obtained single write data having the same size as the data write unit from the host 2. In this case, the write control unit 21 may acquire the obtained write data from the host 2 by one DMA transfer. The write control unit 21 transfers the acquired write data having the same size as the data write unit of the NAND flash memory 5 to the NAND flash memory 5 and writes the write data to the write destination block of the NAND flash memory 5.

As described above, after receiving one or more write commands having an identifier indicating the same write destination block, the write control unit 21 acquires, from the host 2, write data having the same size as the data write unit of the NAND flash memory 5, obtained by dividing the write data associated with one write command in the received write commands into a plurality of write data (a plurality of data portions) or combining the write data associated with two or more write commands in the received write commands.

Here, the division/combination of the write data means an operation for, based on a data pointer and a length designated by each of one or more write commands having an identifier indicating the same write destination block, (i) dividing a set of write data associated with one or more write commands by boundaries having the same size as the data write unit of the NAND flash memory 5 from a head thereof and (ii) specifying a location in the host memory corresponding to each boundary.

Therefore, the write data can be acquired from the host 2 in a unit of the same data size as the data write unit of the NAND flash memory 5, regardless of the size of the write data designated by each write command, so that the acquired write data can be immediately transferred to the NAND flash memory 5. Therefore, even if a write command requesting writing of large-sized write data to a certain write destination block is received, it is possible to prevent stagnation of a data write operation for other write destination block due to this.

Further, a buffer-less configuration in which an internal buffer does not exist in the flash storage device 3 or the capacity of the internal buffer is nearly zero can be applied to the flash storage device 3.

In the case where a plurality of write destination blocks belong to different NAND flash memory chips, respectively, the operation for transferring the write data to the NAND flash memory 5 means transferring the write data to the NAND flash memory chip including the write destination block where the write data is to be written.

The above processing for acquiring the write data from the host 2 in a unit of the same data size as the data write unit of the NAND flash memory 5 is executed in accordance with the progress of the write operation for each write destination block.

That is, the write control unit 21 manages the progress of the write operation for each write destination block. In addition, for example, whenever data transfer to a next write destination page of a certain write destination block is enabled, the write control unit 21 advances a location of the write destination page in the write destination block, acquires write data to be written to the next write destination page from the host memory, and writes the acquired write data to the write destination block.

Furthermore, when all of the write operation (write operation for transferring the same data to the NAND flash memory 5 once or more) for the entire write data associated with one write command designating the certain write destination block is finished, the write control unit 21 returns a response indicating command completion of the write command to the host 2.

For example, in the case where large-sized write data associated with one write command is divided into a plurality of write data portions, when all data transfers and all write operations necessary for writing all of the write data portions are finished, a response indicating command completion of the write command is returned to the host 2. As a result, it is possible to correctly notify the host 2 of the command completion in a unit of the write command. Therefore, even when large-sized write data requested to be written by one write command is divided into a plurality of write data portions and processed, the host 2 can correctly receive only a response indicating command completion of one write command from the flash storage device 3. Therefore, the host 2 may perform only simple processing for discarding the write data corresponding to the write command of which the command completion has been given in notification, from the host memory.

Further, when all of a write operation (write operation involving transferring the same data to the NAND flash memory 5 once or more) for the entire write data associated with one write command designating a certain write destination block is finished and the entire write data becomes readable from the NAND flash memory 5, the write control unit 21 may return a response indicating command completion of the write command to the host 2.

For example, the case where data written to a certain page of a certain write destination block becomes readable after data is written to one or more subsequent pages is assumed. In this case, when all data transfers and all write operations necessary for writing all of a plurality of write data portions obtained by dividing the large-sized write data associated with one write command are finished, the write control unit 21 does not return a response indicating command completion to the host 2. After data is written to one or more subsequent pages, the write control unit 21 returns a response indicating the command completion of the write command to the host 2.

As a result, the host 2 performs only simple processing for discarding the write data corresponding to the write command of which the command completion has been given in notification, from the host memory, thereby maintaining the write data in the host memory until the write data of each write command becomes readable.

The read control unit 22 receives a read command from the host 2 and reads data designated by the received read command from the NAND flash memory 5 or an internal buffer 31.

When the data (first data) designated by the read command is data in which all of the write operation (write operation involving transferring the same data to the NAND flash memory 5 once or more) has not been finished or data in which all of the write operation has been finished, but which has not yet become readable from the NAND flash memory 5, the read control unit 22 determines whether the first data exists in the internal buffer 31. In the case where the first data does not exist in the internal buffer 31, the read control unit 22 acquires the first data from the host memory, stores the acquired first data in the internal buffer 31, and returns the acquired first data from the internal buffer 31 to the host 2. As a result, the host 2 does not perform complicated processing for managing whether data desired to be read is readable from the NAND flash memory 5 and performs only simple processing for sending a read command designating the data desired to be read to the flash storage device 3, thereby receiving the data desired to be read from the flash storage device 3.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the storage region of the DRAM 6 may be used as the internal buffer (shared cache) 31. The internal buffer (shared cache) 31 is shared by a plurality of write destination blocks and is used for temporarily storing write data associated with an arbitrary write command received from the host 2. As described above, the buffer-less configuration where the internal buffer (shared cache) 31 does not exist in the flash storage device 3 or the capacity of the internal buffer (shared cache) 31 is nearly zero may be applied to the flash storage device 3.

Further, another part of the storage region of the DRAM 6 may be used for storing a block management table 32 and a defect information management table 33. The block management table 32 includes a plurality of management tables corresponding to a plurality of blocks in the NAND flash memory 5. Each management table includes a plurality of valid/invalid management information corresponding to a plurality of data included in the block corresponding to the management table. Each of the valid/invalid management information indicates whether the data corresponding to the valid/invalid management information is valid data or invalid data. The defect information management table 33 manages a list of defective blocks (bad blocks).

The internal buffer (shared cache) 31, the block management table 32, and the defect information management table 33 may be stored in an SRAM (not illustrated in the drawings) in the controller 4.

The DMAC 15 executes data transfer between the host memory and the internal buffer (shared cache) 31 under the control of the CPU 12. When the write data is to be transferred from the host memory to the internal buffer (shared cache) 31, the CPU 12 designates a transfer source address indicating a location on the host memory, a data size, and a transfer destination address indicating a location on the internal buffer (shared cache) 31, with respect to the DMAC 15.

When data is to be written to the NAND flash memory 5, the ECC encoding/decoding unit 16 encodes the data (data to be written) (ECC encoding), thereby adding an error correction code (ECC) as a redundant code to the data. When data is read from the NAND flash memory 5, the ECC encoding/decoding unit 16 performs error correction of the data (ECC decoding) by using the ECC added to the read data.

FIG. 5 illustrates a relation between a write data buffer 51 and a flash translation unit 52 included in the host 2 and the write control unit 21, the DMAC 15, and the internal buffer (shared cache) 31 included in the flash storage device 3.

The host 2 stores the write data in the write data buffer 51 on the host memory and issues a write command to the flash storage device 3. The write command may include a data pointer indicating a location on the write data buffer 51 where the write data exists, a tag (for example, an LBA) for identifying the write data, a length of the write data, and an identifier (a block address or a stream ID) indicating a block where the write data is to be written.

In the flash storage device 3, under the control of the write control unit 21, in accordance with the progress of the write operation of the write destination block designated by the identifier of the block, the data transfer from the write data buffer 51 to the internal buffer (shared cache) 31 is executed by the DMAC 15. The data transfer is executed in a unit of the same data size as the data write unit of the NAND flash memory 5, as described above. Under the control of the write control unit 21, the write data to be written is transferred from the internal buffer (shared cache) 31 to the NAND flash memory chip including the write destination block and a NAND command for a write instruction is sent from the write control unit 21 to the NAND flash memory chip.

In the case where the flash storage device 3 is realized as the type #2-storage device, the write control unit 21 also executes processing for allocating one of free blocks as the write destination block to the host 2 in response to a block allocation request received from the host 2. The block allocation request may include a QoS domain ID. The write control unit 21 determines one of the free blocks belonging to the QoS domain ID as the write destination block and notifies the host 2 of the block address of the write destination block. As a result, the host 2 can issue a write command designating the block address, the data pointer, the tag (for example, the LBA), and the length. After the write data is written to the write destination block, the write control unit 21 notifies the host 2 of the block address indicating the write destination block where the write data has been written, the page address indicating the page in the write destination block where the write data has been written, and the tag (for example, the LBA) of the write data. The flash translation unit 52 of the host 2 includes an LUT 404A to be an address translation table for managing the mapping between each of tags (for example, the LBAs) and each of physical addresses (block addresses, page addresses, and the like) of the NAND flash memory 5. When the block address, the page address, and the tag (for example, the LBA) are given in notification from the flash storage device 3, the flash translation unit 52 updates the LUT 404A and maps the physical address (the block address and the page address) given in notification to the tag (for example, the LBA) given in notification. By referring to the LUT 404A, the flash translation unit 52 can translate the tag (for example, the LBA) included in the read request into the physical address (the block address and the page address), thereby issuing the read command including the physical address to the flash storage device 3.

FIG. 6 illustrates I/O command processing executed by the flash storage device 3.

As described above, in the present embodiment, the flash storage device 3 may be any one of the type #1-storage device, the type #2-storage device, and the type #3-storage device. However, in FIG. 6, the case where the flash storage device 3 is the type #1-storage device is exemplified.

Each write command issued by the host 2 includes a block address, a page address, a data pointer, and a length. Each issued write command is input to an I/O command queue 42. Each read command issued by the host 2 also includes a block address, a page address, a data pointer, and a length. Each issued read command is also input to the I/O command queue 42.

When the host 2 desires to request the flash storage device 3 to write the write data, the host 2 first stores the write data in the write data buffer 51 on the host memory and issues the write command to the flash storage device 3. The write command includes a block address indicating a write destination block where the write data is to be written, a page address indicating a page in the write destination block where the write data is to be written, a data pointer indicating a location in the write data buffer 51 where the write data exists, and a length of the write data.

The flash storage device 3 includes a program/read sequencer 41. The program/read sequencer 41 is realized by the write control unit 21 and the read control unit 22 described above. The program/read sequencer 41 can execute each command input to the I/O command queue 42 in arbitrary order.

After the program/read sequencer 41 acquires one or more write commands designating the same write destination block from the I/O command queue 42, the program/read sequencer 41 sends, to the internal buffer (shared cache) 31, a transfer request to acquire next write data (for example, write data corresponding to one page size) to be written to the write destination block from the internal buffer (shared cache) 31 or the write data buffer 51, in accordance with the progress of the write operation of the write destination block. The transfer request may include a data pointer and a length. The data pointer included in the transfer request is calculated by processing for dividing the write data associated with one write command or combining two or more write data associated with two or more write commands designating the same write destination block. That is, the program/read sequencer 41 divides a set of write data associated with one or more write commands having an identifier indicating the same write destination block by boundaries having the same size as the data write unit of the NAND flash memory 5 from a head thereof and specifies a location in the host memory corresponding to each boundary. As a result, the program/read sequencer 41 can acquire the write data from the host 2 in a unit of the same size as the write unit.

The data pointer included in the transfer request indicates a location on the write data buffer 51 where the write data corresponding to one page size exists. The write data corresponding to one page size may be a set of a plurality of small-sized write data associated with a plurality of write commands designating the write destination block or may be a part of large-sized write data associated with one write command designating the write destination block.

Furthermore, the program/read sequencer 41 sends, to the internal buffer (shared cache) 31, the block address of the write destination block where the write data corresponding to one page size is to be written and the page address of the page to which the write data corresponding to one page size is to be written.

The controller 4 of the flash storage device 3 may include a cache controller controlling the internal buffer (shared cache) 31. In this case, the cache controller can operate the internal buffer (shared cache) 31 as if it is control logic. A plurality of flash command queues 43 exist between the internal buffer (shared cache) 31 and a plurality of write destination blocks #0, #1, #2, . . . , and #n. These flash command queues 43 are associated with a plurality of NAND flash memory chips, respectively.

The internal buffer (shared cache) 31, that is, the cache controller determines whether the write data corresponding to one page size designated by the transfer request exists in the internal buffer (shared cache) 31.

If the write data corresponding to one page size designated by the transfer request exists in the internal buffer (shared cache) 31, the internal buffer (shared cache) 31, that is, the cache controller transfers the write data corresponding to one page size to the NAND flash memory chip including the write destination block where the write data is to be written. Further, the internal buffer (shared cache) 31, that is, the cache controller sends, to the NAND flash memory chip including the write destination block where the write data is to be written, the block address of the write destination block, the page address where the write data is to be written, and the NAND command (flash write command) for the write instruction via the flash command queue 43. The flash command queue 43 is provided for each NAND flash memory chip. For this reason, the internal buffer (shared cache) 31, that is, the cache controller inputs, to the flash command queue 43 corresponding to the NAND flash memory chip including the write destination block where the write data is to be written, the block address of the write destination block, the page address where the write data is to be written, and the NAND command (flash write command) for the write instruction.

If the transfer of the write data corresponding to one page size from the internal buffer (shared cache) 31 to the NAND flash memory chip is final data transfer necessary for writing the write data to the NAND flash memory chip, the internal buffer (shared cache) 31, that is, the cache controller discards the write data from the internal buffer (shared cache) 31 and secures the region where the write data has been stored as a free region. In the case where the write data is written to the write destination block by the write operation (for example, the full-sequence write operation and the like) involving transferring data to the NAND flash memory chip once, the first data transfer to the NAND flash memory chip becomes the final data transfer. On the other hand, in the case where the write data is written to the write destination block by the write operation (for example, the foggy-fine write operation) involving transferring data to the NAND flash memory chip multiple times, the data transfer to the NAND flash memory chip necessary for the final fine write becomes the final data transfer.

Next, the case where the write data corresponding to one page size designated by the transfer request does not exist in the internal buffer (shared cache) 31 will be described.

If the write data corresponding to one page size designated by the transfer request does not exist in the internal buffer (shared cache) 31, the internal buffer (shared cache) 31, that is, the cache controller sends the transfer request (the data pointer and the length) to the DMAC 15. The DMAC 15 transfers the write data corresponding to one page size from the write data buffer 51 on the host memory to the internal buffer (shared cache) 31, based on the transfer request (the data pointer and the length). If the data transfer is finished, the DMAC 15 notifies the internal buffer (shared cache) 31, that is, the cache controller, of the transfer completion (Done), the data pointer, and the length.

If the free region exists in the internal buffer (shared cache) 31, the internal buffer (shared cache) 31, that is, the cache controller stores the write data acquired from the write data buffer 51 by the DMA transfer in the free region.

If the free region does not exist in the internal buffer (shared cache) 31, the internal buffer (shared cache) 31, that is, the cache controller discards the oldest write data in the internal buffer (shared cache) 31 from the internal buffer (shared cache) 31 and secures a region where the oldest write data has been stored as a free region. In addition, the internal buffer (shared cache) 31, that is, the cache controller stores the write data acquired from the write data buffer 51 by the DMA transfer in the free region.

In the case where the multi-step write operation such as the foggy-fine write operation is used, the cache controller discards the oldest write data among the write data in the internal buffer (shared cache) 31 in which the first write operation step such as the foggy write operation is finished.

A progress speed of the data write operation for the write destination block having a large data write amount tends to be faster than a progress speed of the data write operation for the write destination block having a small data write amount. Therefore, the write data to be written to the write destination block having the large data write amount is frequently transferred from the write data buffer 51 to the internal buffer (shared cache) 31. As a result, there is a high possibility that the oldest write data is write data to a write destination block having a relatively small amount of data written from the host 2. Therefore, by using a method of discarding the oldest write data among the write data in the internal buffer (shared cache) 31 in which the first write operation step such as the foggy write operation is finished, it is possible to efficiently reduce data traffic between the host 2 and the flash storage device 3.

An algorithm for selecting the write data to be discarded among the write data in the internal buffer (shared cache) 31 in which the first write operation step such as the foggy write operation is finished is not limited to first in first out for selecting the oldest data and other algorithms such as LRU and random may be used.

The program/read sequencer 41 receives a status, that is, write completion (Done), a write failure (Error), a block address, and a page address from each NAND flash memory chip. In addition, the program/read sequencer 41 determines whether all of a write operation (write operation for transferring the same data to the NAND flash memory chip once or more) for entire write data associated with a write command has been finished, for each write command, based on the status. When all of a write operation for entire write data associated with a certain write command is finished, the program/read sequencer 41 transmits a response (Done) indicating the command completion of the write command to the host 2. The response (Done) indicating the command completion includes a command ID for uniquely identifying the write command.

Next, processing of the read command will be described.

The read command includes a block address indicating a block where data to be read is stored, a page address indicating a page where the data is stored, a data pointer indicating a location in the read data buffer 53 on the host memory to which the data is to be transferred, and a length of the data.

The program/read sequencer 41 sends the block address and the page address designated by the read command to the internal buffer (shared cache) 31 and requests the internal buffer (shared cache) 31 to read the data designated by the read command.

The internal buffer (shared cache) 31, that is, the cache controller sends, to the NAND flash memory chip, the block address, the page address, and the NAND command (flash read command) for the read instruction via the flash command queue 43. The data read from the NAND flash memory chip is transferred to the read data buffer 53 by the DMAC 15.

When the data designated by the read command is data in which the write operation has not been finished or data in which all of the write operation has been finished, but which has not yet become readable from the NAND flash memory 5, the internal buffer (shared cache) 31, that is, the cache controller may determine whether the data exists in the internal buffer (shared cache) 31. If the data exists in the internal buffer (shared cache) 31, the data is read from the internal buffer (shared cache) 31 and transferred to the read data buffer 53 by the DMAC 15.

On the other hand, if the data does not exist in the internal buffer (shared cache) 31, the data is first transferred from the write data buffer 51 to the internal buffer (shared cache) 31 by the DMAC 15. In addition, the data is read from the internal buffer (shared cache) 31 and transferred to the read data buffer 53 by the DMAC 15.

Figure 7:
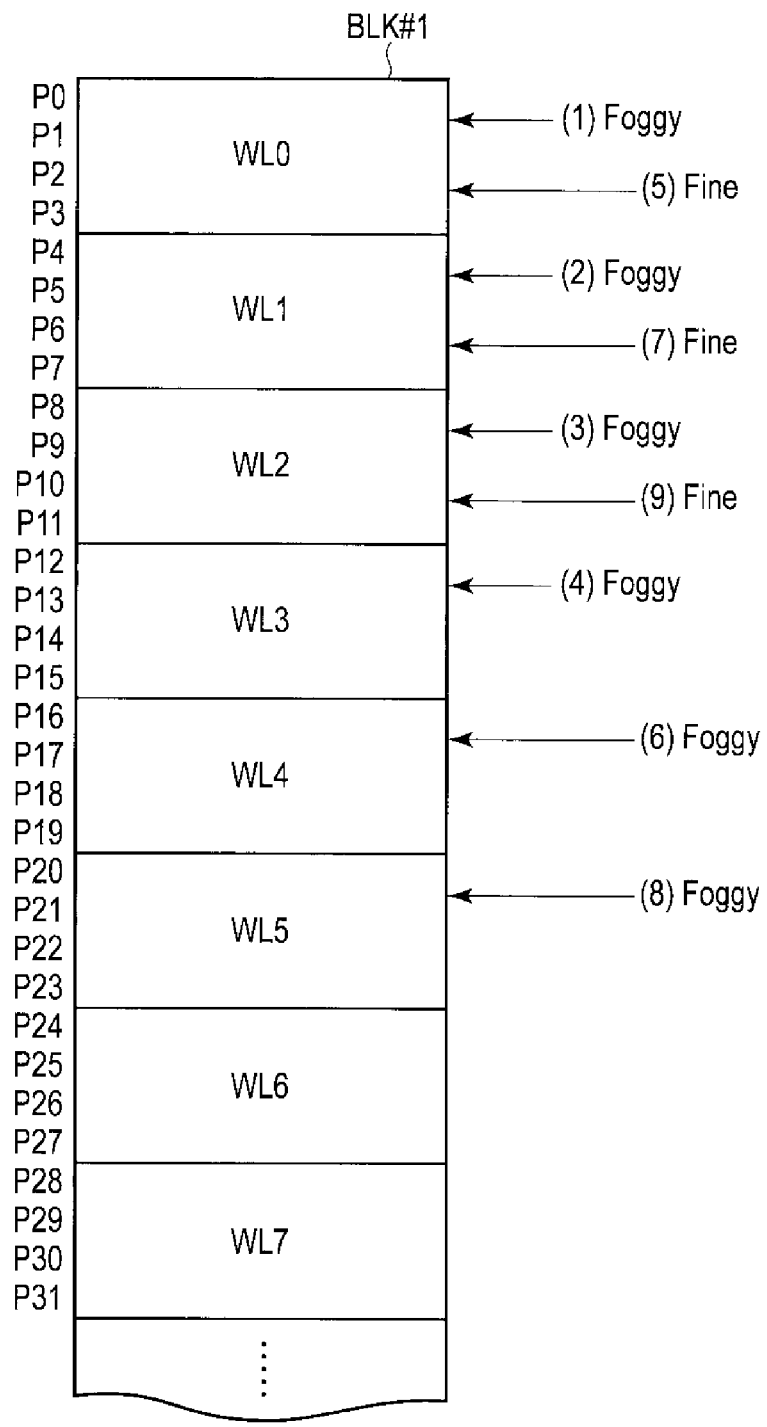
FIG. 7 is a diagram illustrating a multi-step write operation executed by the memory system according to the embodiment.

FIG. 7 illustrates a multi-step write operation executed by the flash storage device 3.

Here, a foggy-fine write operation executed across four word lines is exemplified. Here, the case where the NAND flash memory 5 is a QLC-flash storing 4-bit data per memory cell is assumed. The foggy-fine write operation for one specific write destination block (here, the write destination block BLK #1) in the NAND flash memory 5 is executed as follows.

(1) First, write data of four pages (P0 to P3) is transferred to the NAND flash memory 5 in a page unit and the foggy write operation for writing the write data of the four pages (P0 to P3) into a plurality of memory cells connected to a word line WL0 in the write destination block BLK #1 is executed.

(2) Next, write data of next four pages (P4 to P7) is transferred to the NAND flash memory 5 in a page unit and the foggy write operation for writing the write data of the four pages (P4 to P7) into a plurality of memory cells connected to a word line WL1 in the write destination block BLK #1 is executed.

(3) Next, write data of next four pages (P8 to P11) is transferred to the NAND flash memory 5 in a page unit and the foggy write operation for writing the write data of the four pages (P8 to P11) into a plurality of memory cells connected to a word line WL2 in the write destination block BLK #1 is executed.

(4) Next, write data of next four pages (P12 to P15) is transferred to the NAND flash memory 5 in a page unit and the foggy write operation for writing the write data of the four pages (P12 to P15) into a plurality of memory cells connected to a word line WL3 in the write destination block BLK #1 is executed.

(5) When the foggy write operation for the memory cells connected to the word line WL3 is finished, a write target word line returns to the word line WL0 and the fine write operation for the memory cells connected to the word line WL0 can be executed. In addition, the same write data of four pages (P0 to P3) as the write data of the four pages (P0 to P3) used in the foggy write operation for the word line WL0 is transferred again to the NAND flash memory 5 in a page unit and the fine write operation for writing the write data of the four pages (P0 to P3) into the memory cells connected to the word line WL0 in the write destination block BLK #1 is executed. As a result, the foggy-fine write operation for the pages P0 to P3 is finished.

(6) Next, write data of next four pages (P16 to P19) is transferred to the NAND flash memory 5 in a page unit and the foggy write operation for writing the write data of the four pages (P16 to P19) into a plurality of memory cells connected to a word line WL4 in the write destination block BLK #1 is executed.

(7) When the foggy write operation for the memory cells connected to the word line WL4 is finished, a write target word line returns to the word line WL1 and the fine write operation for the memory cells connected to the word line WL1 can be executed. In addition, the same write data of four pages (P4 to P7) as the write data of the four pages (P4 to P7) used in the foggy write operation for the word line WL1 is transferred again to the NAND flash memory 5 in a page unit and the fine write operation for writing the write data of the four pages (P4 to P7) into the memory cells connected to the word line WL1 in the write destination block BLK #1 is executed. As a result, the foggy-fine write operation for the pages P4 to P7 is finished.

(8) Next, write data of next four pages (P20 to P23) is transferred to the NAND flash memory 5 in a page unit and the foggy write operation for writing the write data of the four pages (P20 to P23) into a plurality of memory cells connected to a word line WL5 in the write destination block BLK #1 is executed.

(9) When the foggy write operation for the memory cells connected to the word line WL5 is finished, a write target word line returns to the word line WL2 and the fine write operation for the memory cells connected to the word line WL2 can be executed. In addition, the same write data of four pages (P8 to P11) as the write data of the four pages (P8 to P11) used in the foggy write operation for the word line WL2 is transferred again to the NAND flash memory 5 in a page unit and the fine write operation for writing the write data of the four pages (P8 to P11) into the memory cells connected to the word line WL2 in the write destination block BLK #1 is executed. As a result, the foggy-fine write operation for the pages P8 to P11 is finished.

FIG. 8 illustrates order of writing data to the write destination block BLK #1.

Here, similarly to FIG. 7, the case where the foggy-fine write operation is executed across four word lines is assumed.

Data d0, data d1, data d2, data d3, data d4, data d5, data d6, data d7, . . . , data d252, data d253, data d254, and data d255 illustrated in a left portion of FIG. 8 indicate a plurality of write data corresponding to a plurality of write commands designating the write destination block BLK #1. Here, for the sake of simplification of illustration, the case where all the write data have the same size is assumed.

A right portion of FIG. 8 illustrates order of writing data to the write destination block BLK #1. The write operation is performed in order of writing data d0 to a plurality of memory cells connected to the word line WL0 (foggy write), writing data d1 to a plurality of memory cells connected to the word line WL1 (foggy write), writing data d2 to a plurality of memory cells connected to the word line WL2 (foggy write), writing data d3 to a plurality of memory cells connected to the word line WL3 (foggy write), writing data d0 to the plurality of memory cells connected to the word line WL0 (fine write), writing data d4 to a plurality of memory cells connected to the word line WL4 (foggy write), writing data d1 to the plurality of memory cells connected to the word line WL1 (fine write), writing data d5 to a plurality of memory cells connected to the word line WL5 (foggy write), writing data d2 to the plurality of memory cells connected to the word line WL2 (fine write), . . . .

Figure 9:
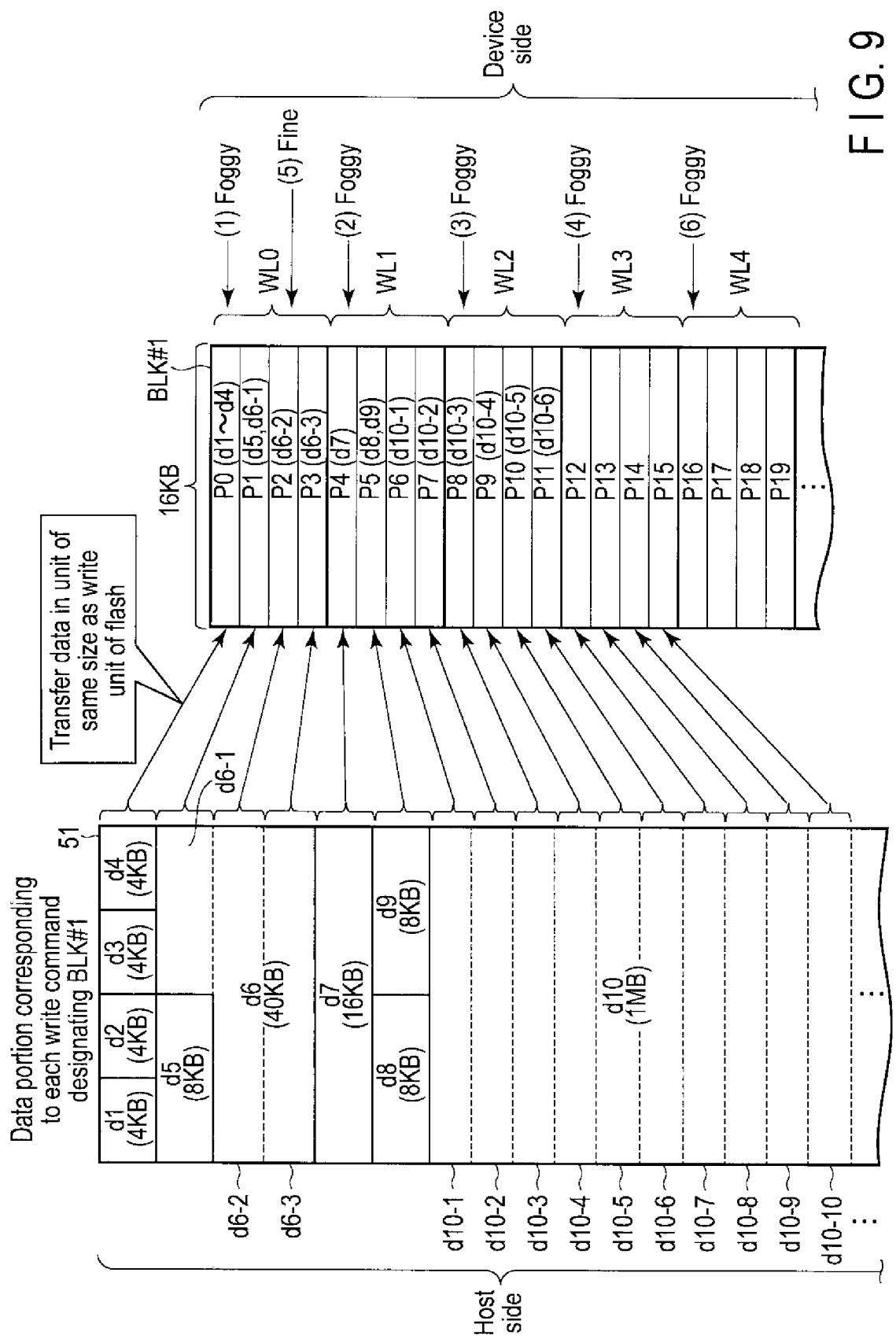
FIG. 9 is a diagram illustrating an operation for transferring write data from the host to the memory system according to the embodiment in a unit of the same size as a data write unit of a nonvolatile memory.

FIG. 9 illustrates an operation for transferring write data from the host 2 to the flash storage device 3 in a unit of the same size as the data write unit of the NAND flash memory 5.

Data d1, data d2, data d3, data d4, data d5, data d6, data d7, data d8, data d9, data d10, illustrated in a left portion of FIG. 9 indicate ten write data corresponding to ten write commands designating the write destination block BLK #1. The length (size) of the write data is different for each write command. In FIG. 9, the case where each of the data d1, the data d2, the data d3, and the data d4 has a size of 4 Kbytes, the data d5 has a size of 8 Kbytes, the data d6 has a size of 40 Kbytes, the data d7 has a size of 16 Kbytes, each of the data d8 and the data d9 has a size of 8 Kbytes, and the data d10 has a size of 1 Mbyte is assumed.

Since each write command received from the host 2 includes a data pointer, a length, and a block identifier (for example, a block address), the controller 4 of the flash storage device 3 can classify the write commands received from the host 2 into a plurality of groups corresponding to a plurality of write destination blocks. The data d1, the data d2, the data d3, the data d4, the data d5, the data d6, the data d7, the data d8, the data d9, the data d10, correspond to ten write command classified into a group corresponding to the write destination block BLK #1. These ten write commands are write commands including a block identifier (for example, a block address) indicating the write destination block BLK #1.

The controller 4 of the flash storage device 3 manages a location on the write data buffer 51 where each of the data d1, the data d2, the data d3, the data d4, the data d5, the data d6, the data d7, the data d8, the data d9, and the data d10 exists and a length of each of the data d1, the data d2, the data d3, the data d4, the data d5, the data d6, the data d7, the data d8, the data d9, and the data d10, based on the data pointer and the length in each of the write commands designating the write destination block BLK #1. In addition, the controller 4 acquires, from the host 2, write data having the same size as the data write unit of the NAND flash memory 5, which is obtained by dividing large-sized write data associated with one write command into a plurality of write data (a plurality of data portions) or combining two or more small-sized write data associated with the two or more write commands.

In FIG. 9, the controller 4 first acquires write data of 16 Kbytes obtained by combining the data d1, the data d2, the data d3, and the data d4 each having a size of 4 Kbytes, from the write data buffer 51 of the host 2. In this case, although not limited thereto, the controller 4 may transfer write data of 16 Kbytes from the write data buffer 51 of the host 2 to the internal buffer 31 by four DMA transfers. In the first DMA transfer, a transfer source address designating a head location of the data d1 and a data length=4 KB may be set to the DMAC 15. The transfer source address designating the head location of the data d1 is represented by the data pointer in the write command corresponding to the data d1. In the second DMA transfer, a transfer source address designating a head location of the data d2 and a data length=4 KB may be set to the DMAC 15. The transfer source address designating the head location of the data d2 is represented by the data pointer in the write command corresponding to the data d2. In the third DMA transfer, a transfer source address designating a head location of the data d3 and a data length=4 KB may be set to the DMAC 15. The transfer source address designating the head location of the data d3 is represented by the data pointer in the write command corresponding to the data d3. In the fourth DMA transfer, a transfer source address designating a head location of the data d4 and a data length=4 KB may be set to the DMAC 15. The transfer source address designating the head location of the data d4 is represented by the data pointer in the write command corresponding to the data d4.

In addition, the controller 4 transfers the write data (d1, d2, d3, and d4) of 16 KBytes acquired by the DMA transfer as data to be written to the page P0 of the write destination block BLK #1 to the NAND flash memory 5.

The controller 4 changes a next write destination page of the write destination block BLK #1 to the page P1 and acquires write data of 16 Kbytes obtained by combining the data d5 having a size of 8 Kbytes and head data d6-1 of 8 Kbytes in the data d6 from the write data buffer 51 of the host 2. In this case, although not limited thereto, the controller 4 may transfer write data of 16 Kbytes from the write data buffer 51 of the host 2 to the internal buffer 31 by two DMA transfers. In the first DMA transfer, a transfer source address designating a head location of the data d5 and a data length=8 KB may be set to the DMAC 15. The transfer source address designating the head location of the data d5 is represented by the data pointer in the write command corresponding to the data d5. In the second DMA transfer, a transfer source address designating a head location of the data d6-1 and a data length=8 KB may be set to the DMAC 15. The transfer source address designating the head location of the data d6-1 is represented by the data pointer in the write command corresponding to the data d6.

In addition, the controller 4 transfers the write data (d5 and d6-1) of 16 Kbytes as data to be written to the page P1 of the write destination block BLK #1 to the NAND flash memory 5.

The controller 4 changes a next write destination page of the write destination block BLK #1 to the page P2 and acquires first 16 Kbyte data d6-2 among the remaining 32 Kbyte data of the data d6 from the write data buffer 51 of the host 2. In this case, although not limited thereto, the controller 4 may transfer write data of 16 Kbytes from the write data buffer 51 of the host 2 to the internal buffer 31 by one DMA transfer. In the DMA transfer, a transfer source address designating a head location of the data d6-2 and a data length=16 KB may be set to the DMAC 15. The transfer source address designating the head location of the data d6-2 can be obtained by adding an offset corresponding to 8 KB to a value of the data pointer in the write command corresponding to the data d6.

In addition, the controller 4 transfers the write data (d6-2) of 16 Kbytes as data to be written to the page P2 of the write destination block BLK #1 to the NAND flash memory 5.

The controller 4 changes a next write destination page of the write destination block BLK #1 to the page P3 and acquires the remaining 16 Kbyte data d6-3 of the data d6 from the write data buffer 51 of the host 2.

In this case, although not limited thereto, the controller 4 may transfer write data of 16 Kbytes from the write data buffer 51 of the host 2 to the internal buffer 31 by one DMA transfer. In the DMA transfer, a transfer source address designating a head location of the data d6-3 and a data length=16 KB may be set to the DMAC 15. The transfer source address designating the head location of the data d6-3 can be obtained by adding an offset corresponding to 24 KB to a value of the data pointer in the write command corresponding to the data d6.

In addition, the controller 4 transfers the write data (d6-3) of 16 Kbytes as data to be written to the page P3 of the write destination block BLK #1 to the NAND flash memory 5.

In addition, the controller 4 writes data (P0 to P3) of four pages to a plurality of memory cells connected to the word line WL0 of the write destination block BLK #1 by the foggy write operation.

The controller 4 changes a next write destination page of the write destination block BLK #1 to the page P4 and acquires the data d7 having a size of 16 Kbytes from the write data buffer 51 of the host 2. In this case, although not limited thereto, the controller 4 may transfer write data of 16 Kbytes from the write data buffer 51 of the host 2 to the internal buffer 31 by one DMA transfer. In the DMA transfer, a transfer source address designating a head location of the data d7 and a data length=16 KB may be set to the DMAC 15.

The transfer source address designating the head location of the data d7 is represented by the data pointer in the write command corresponding to the data d7.

In addition, the controller 4 transfers the write data (d7) of 16 Kbytes as data to be written to the page P4 of the write destination block BLK #1 to the NAND flash memory 5.

The controller 4 changes a next write destination page of the write destination block BLK #1 to the page P5 and acquires write data of 16 Kbytes obtained by combining the data d8 having a size of 8 Kbytes and the data d9 having a size of 8 Kbytes from the write data buffer 51 of the host 2. In this case, although not limited thereto, the controller 4 may transfer write data of 16 Kbytes from the write data buffer 51 of the host 2 to the internal buffer 31 by two DMA transfers. In the first DMA transfer, a transfer source address designating a head location of the data d8 and a data length=8 KB may be set to the DMAC 15. The transfer source address designating the head location of the data d8 is represented by the data pointer in the write command corresponding to the data d8. In the second DMA transfer, a transfer source address designating a head location of the data d9 and a data length=8 KB may be set to the DMAC 15. The transfer source address designating the head location of the data d9 is represented by the data pointer in the write command corresponding to the data d9.

In addition, the controller 4 transfers the write data (d8 and d9) of 16 Kbytes as data to be written to the page P5 of the write destination block BLK #1 to the NAND flash memory 5.

The controller 4 changes a next write destination page of the write destination block BLK #1 to the page P6 and acquires head data d10-1 of 16 Kbytes in the data d10 from the write data buffer 51 of the host 2. In this case, although not limited thereto, the controller 4 may transfer write data of 16 Kbytes from the write data buffer 51 of the host 2 to the internal buffer 31 by one DMA transfer. In the DMA transfer, a transfer source address designating a head location of the data d10-1 and a data length=16 KB may be set to the DMAC 15. The transfer source address designating the head location of the data d10-1 is represented by the data pointer in the write command corresponding to the data d10.

In addition, the controller 4 transfers the write data (d10-1) of 16 Kbytes as data to be written to the page P6 of the write destination block BLK #1 to the NAND flash memory 5.

The controller 4 changes a next write destination page of the write destination block BLK #1 to the page P7 and acquires next 16 Kbyte data d10-2 of the data d10 from the write data buffer 51 of the host 2. In this case, although not limited thereto, the controller 4 may transfer write data of 16 Kbytes from the write data buffer 51 of the host 2 to the internal buffer 31 by one DMA transfer. In the DMA transfer, a transfer source address designating a head location of the data d10-2 and a data length=16 KB may be set to the DMAC 15. The transfer source address designating the head location of the data d10-2 can be obtained by adding an offset corresponding to 16 KB to a value of the data pointer in the write command corresponding to the data d10.

In addition, the controller 4 transfers the write data (d10-2) of 16 Kbytes as data to be written to the page P7 of the write destination block BLK #1 to the NAND flash memory 5.

In addition, the controller 4 writes data (P4 to P7) of four pages to a plurality of memory cells connected to the word line WL1 of the write destination block BLK #1 by the foggy write operation.

As described above, in accordance with the progress of the write operation of the write destination block BLK #1, the controller 4 acquires data of 16 Kbytes to be transferred to the write destination page of the write destination block BLK #1 from the host 2.

In addition, when the foggy write operation for the plurality of memory cells connected to the word line WL3 is finished, the fine write operation for the plurality of memory cells connected to the word line WL0 can be executed. The controller 4 changes a next write destination page of the write destination block BLK #1 to the page P0. In the same procedure as the above, the controller 4 transfers the write data (P0 to P3) again to the NAND flash memory 5 in a page unit and writes the write data (P0 to P3) of the four pages to the plurality of memory cells connected to the word line WL0 of the write destination block BLK #1 by the fine write operation.

As a result, for the first six write commands, that is, the write command corresponding to the data d1, the write command corresponding to the data d2, the write command corresponding to the data d3, the write command corresponding to the data d4, the write command corresponding to the data d5, and the write command corresponding to the data d6, all of the foggy-fine write operation for the entire write data associated with each write command is finished and each of the data d1 to d6 becomes readable from the NAND flash memory 5. Therefore, the controller 4 returns six command completion responses corresponding to the first six write commands to the host 2.

In FIG. 9, the operation for transferring the write data associated with each write command designating the write destination block BLK #1 from the host 2 to the flash storage device 3 in a unit of 16 Kbytes in accordance with the progress of the write operation of the write destination block BLK #1 has been described. However, the same operation as the operation described in FIG. 9 is executed for each of the other write destination blocks BLK #.

Figure 10:
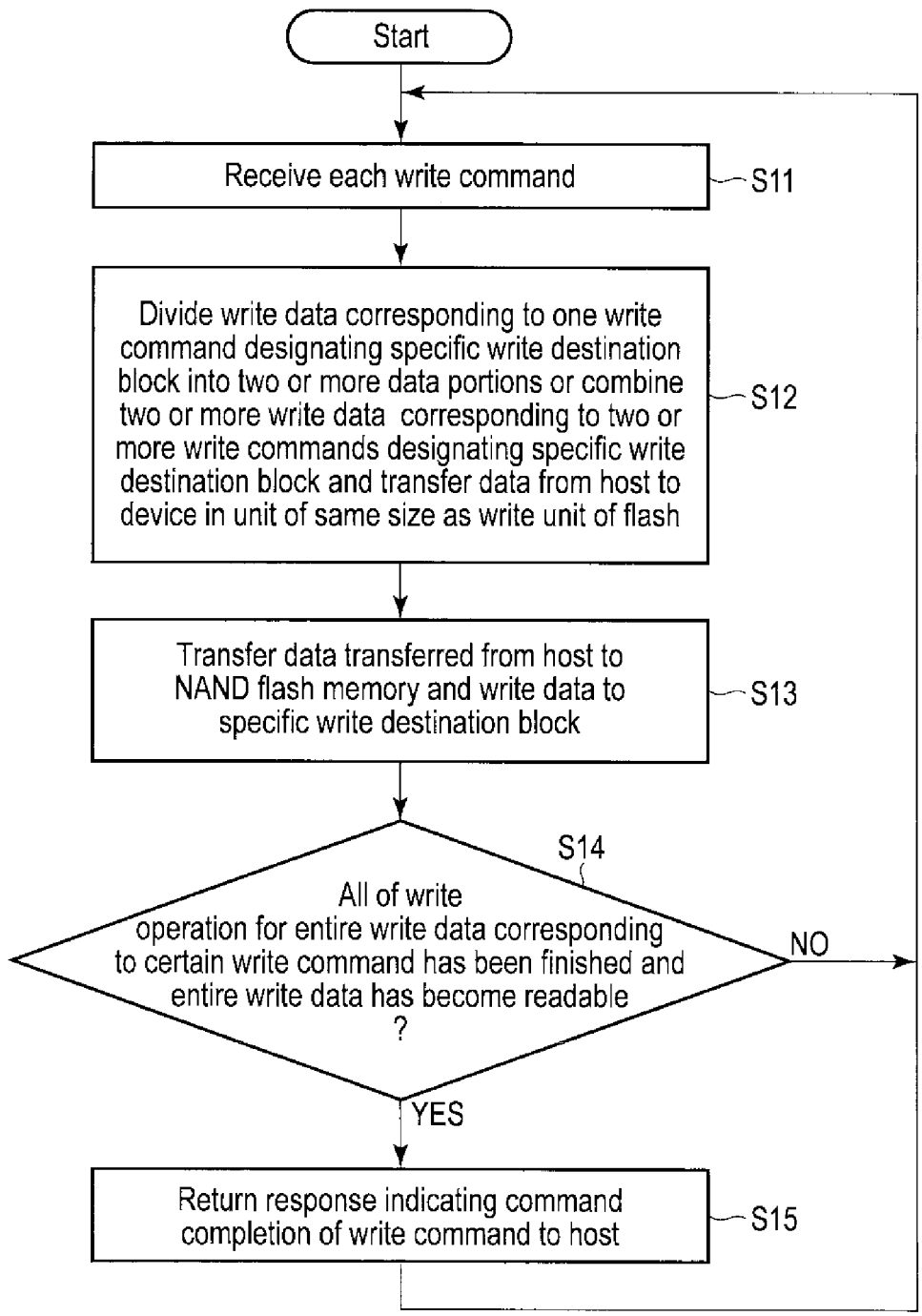
FIG. 10 is a flowchart illustrating a procedure of data write processing executed by the memory system according to the embodiment.

A flowchart of FIG. 10 illustrates a procedure of data write processing executed by the flash storage device 3.

The controller 4 of the flash storage device 3 receives each write command including a data pointer, a length, and a block identifier (for example, a block address) from the host 2 (step S11).

Next, the controller 4 divides large-sized write data corresponding to one write command designating a specific write destination block into two or more data portions or combines two or more write data corresponding to two or more write commands designating the specific write desti- nation block, thereby transferring the data from the host 2 to the flash storage device 3 in a unit of the same size as the write unit (data transfer size) of the NAND flash memory 5 (step S12). In step S12, as described in FIG. 9, for example, one data of 16 Kbytes obtained by combining some write data portions having a small size or one of some write data of 16 Kbytes obtained by dividing the write data having a large size is transferred from the host 2 to the flash storage device 3. In the case where the flash storage device 3 has a configuration including the internal buffer 31, each write data of 16 bytes transferred from the host 2 to the flash storage device 3 is stored in the internal buffer 31. In addition, in step S12, in order to combine some write data portions having small sizes, when a size of write data associated with a preceding write command having an identifier designating a certain write destination block is smaller than the write unit (for example, 16 Kbytes), the controller 4 waits for reception of a subsequent write command having the identifier designating the write destination block.

The controller 4 transfers the data of 16 Kbytes transferred from the host 2 to the NAND flash memory 5 and writes the data of 16 Kbytes to the specific write destination block (step S13).

Then, the controller 4 determines whether all of a write operation (a write operation involving transferring the same data to the NAND flash memory 5 once or more) for the entire write data associated with one write command designating the certain write destination block has been finished and the entire write data has become readable from the NAND flash memory 5 (step S14).

When all of the write operation for the entire write data associated with one write command designating the certain write destination block is finished and the entire write data is readable from the NAND flash memory 5, the controller 4 returns a response indicating the command completion of the write command to the host 2 (step S15).

In the case of using the write operation involving transferring the same data to the NAND flash memory 5 multiple times like the foggy-fine write operation, when all of the write operation (multi-step write operation) for the entire write data associated with one write command designating the certain write destination block is finished, the controller 4 may return a response indicating the command completion of the write command to the host 2. The reason is that, in the foggy-fine write operation, when the fine write operation of certain data is finished, the data can be correctly read from the NAND flash memory 5.

Further, the following type of NAND flash memory may be used, in which even if the fine write operation of data for a certain page is finished, the data cannot be read and the data can be correctly read after write of data for one or more subsequent pages is finished. In this case, when all of a write operation (multi-step write operation) for the entire write data associated with one write command designating the certain write destination block is finished and the entire write data becomes readable from the NAND flash memory 5 by writing of data to one or more subsequent pages, a response indicating the command completion of the write command may be returned to the host 2.

As described above, in the present embodiment, when the write data associated with the certain write command is transferred from the host 2 to the flash storage device 3, a response indicating the command completion of the write command is not returned to the host 2 and when all of the write operation necessary for writing the entire write data associated with the certain write command is finished or all of the write operation of the entire write data is finished and the entire write data becomes readable from the NAND flash memory 5, a response indicating the command completion of the write command is returned to the host 2.

As a result, the host 2 can maintain the write data of each write command in the write data buffer 51 until the write data of each write command becomes readable from the flash storage device 3, by performing only simple processing for discarding the write data corresponding to the write command of which the command completion has been given in notification, from the write data buffer 51.

A flowchart of FIG. 11 illustrates a procedure of write data discard processing executed by the host 2.

The host 2 determines whether a response indicating the command completion of the write command has been received from the flash storage device 3 (step S21). When the response indicating the command completion of the certain write command has been received from the flash storage device 3 (step S22), the host 2 discards the write data associated with the write command from the write data buffer 51 (step S22).

FIG. 12 illustrates dummy data write processing executed by the flash storage device 3, when a next write command designating a certain write destination block is not received for a threshold period from reception of a latest write command designating the certain write destination block.

Data d1, data d2, data d3, and data d4 illustrated in a left portion of FIG. 12 indicate four write data corresponding to four write commands designating the write destination block BLK #1. In FIG. 12, the case where each of the data d1, the data d2, the data d3, and the data d4 has a size of 4 Kbytes is assumed.

(1) The controller 4 acquires write data of 16 Kbytes obtained by combining the data d1, the data d2, the data d3, and the data d4, from the write data buffer 51 of the host 2. In addition, the controller 4 transfers the write data of 16 Kbytes as data to be written to the page P0 of the write destination block BLK #1 to the NAND flash memory 5. When a subsequent write command designating the write destination block BLK #1 is not received for the threshold period from reception of the latest write command designating the write destination block BLK #1, that is, the write command that has requested writing of the data d4, in order to enable a response indicating the command completion of the latest write command to be returned to the host 2 within a predetermined time, the controller 4 writes dummy data to one or more pages in the write destination block BLK #1 and advances a location of a write destination page in the write destination block BLK #1 where next write data is to be written. For example, the controller 4 transfers dummy data of three pages corresponding to the pages P1 to P3 to the NAND flash memory 5 in a page unit and writes data (P0 to P3) of the four pages to a plurality of memory cells connected to the word line WL0 of the write destination block BLK #1 by the foggy write operation.

(2) Next, the controller 4 transfers dummy data of four pages corresponding to the pages P4 to P7 to the NAND flash memory 5 in a page unit and writes data (P4 to P7) of the four pages to a plurality of memory cells connected to the word line WL1 of the write destination block BLK #1 by the foggy write operation.

(3) Next, the controller 4 transfers dummy data of four pages corresponding to the pages P8 to P11 to the NAND flash memory 5 in a page unit and writes data (P8 to P11) of the four pages to a plurality of memory cells connected to the word line WL2 of the write destination block BLK #1 by the foggy write operation.

(4) Next, the controller 4 transfers dummy data of four pages corresponding to the pages P12 to P15 to the NAND flash memory 5 in a page unit and writes data (P12 to P15) of the four pages to a plurality of memory cells connected to the word line WL3 of the write destination block BLK #1 by the foggy write operation.

(5) Next, the controller 4 transfers the write data of 16 Kbytes obtained by combining the data d1, the data d2, the data d3, and the data d4 from the write data buffer 51 or the internal buffer 31 to the NAND flash memory 5 and transfers the same dummy data (P1 to P3) of three pages as the dummy data (P1 to P3) of the three pages used in the foggy write operation of the word line WL0 to the NAND flash memory 5 in a page unit. In addition, the controller 4 writes the data (P0 to P3) of the four pages to the plurality of memory cells connected to the word line WL0 of the write destination block BLK #1 by the fine write operation. As a result, all of the multi-step write operation of the data d1, the data d2, the data d3, and the data d4 is finished and the data d1, the data d2, the data d3, and the data d4 become readable from the NAND flash memory 5. The controller 4 returns a response indicating the command completion of the first write command having requested writing of the data d1, a response indicating the command completion of the second write command having requested writing of the data d2, a response indicating the command completion of the third write command having requested writing of the data d3, and a response indicating the command completion of the fourth write command having requested writing of the data d4 to the host 2.

In the present embodiment, when the write data is transferred from the host 2 to the flash storage device 3 in a unit of the same data size as the data write unit of the NAND flash memory 5. When all of the write operation of the entire write data of the certain write command is finished or when all of the write operation of the entire write data is finished and the entire write data is readable, a response indicating the command completion of the write command is returned to the host 2. For this reason, for example, when a subsequent write command designating the certain write destination block is not issued from the host 2 for a while after the write command requesting writing of the small write data to the certain write destination block is issued from the host 2 to the flash storage device 3, a timeout error of the write command may occur. In the present embodiment, when a next write command having the certain block identifier is not received for the threshold period after the latest write command having the certain block identifier is received from the host 2, the controller 4 writes the dummy data to next one or more unwritten pages in the write destination block corresponding to the block identifier. Therefore, the write operation of the write destination block can be progressed as necessary, so that it is possible to prevent occurrence of the timeout error of the write command.

Figure 13:
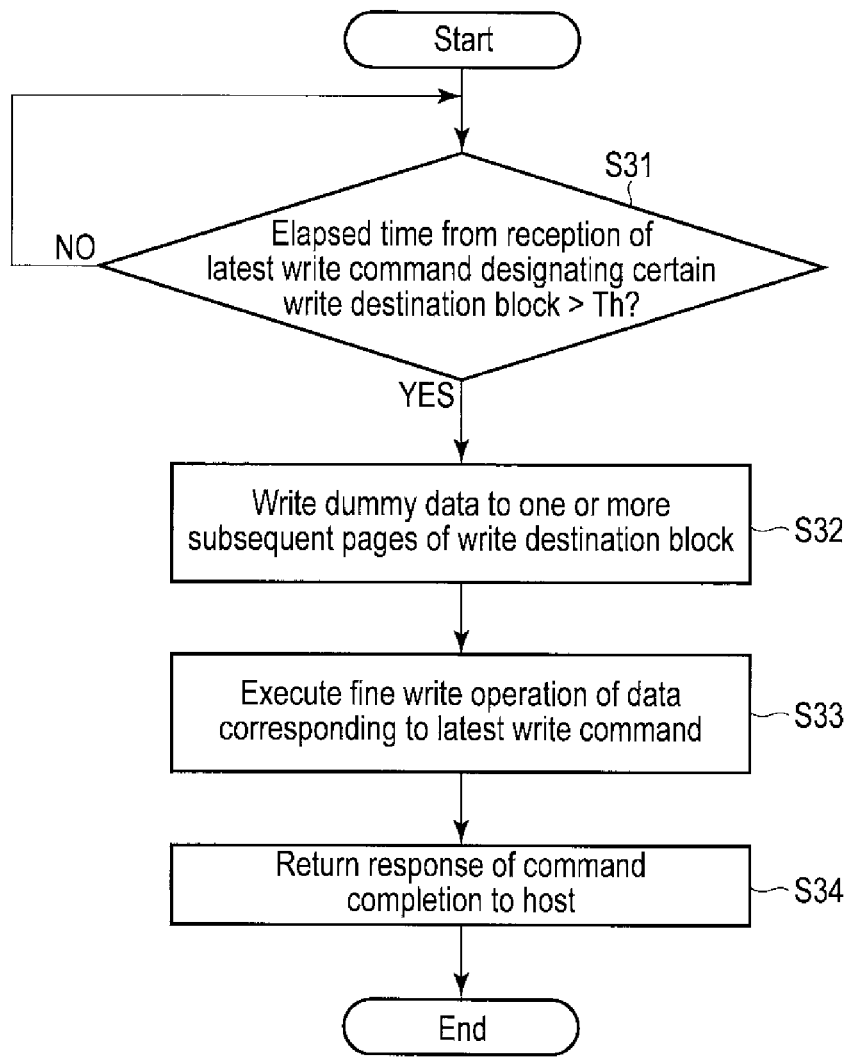
FIG. 13 is a flowchart illustrating a procedure of dummy data write processing executed by the memory system according to the embodiment.

A flowchart of FIG. 13 illustrates a procedure of dummy data write processing executed by the flash storage device 3. Here, the case where data is written to the write destination block by the multi-step write operation such as the foggy-fine write operation is assumed.

The controller 4 of the flash storage device 3 writes the write data associated with the latest write command designating the certain write destination block to the write destination block by the first write operation step such as the foggy write operation. When the next write command designating the write destination block is not received for the threshold period (Th) from the reception of the latest write command (YES in step S31), the controller 4 writes the dummy data to one or more pages subsequent to the page in the write destination block where the write data associated with the latest write command has been written, thereby advancing a location of a write destination page in the write destination block where next write data is to be written (step S32). When the fine write operation (second write operation step) of the write data associated with the latest write command can be executed by advancing the location of the write destination page by writing the dummy data to the write destination block, the controller 4 transfers the write data associated with the latest write command again from the write data buffer 51 or the internal buffer (shared cache) 31 to the NAND flash memory 5 and executes the fine write operation of the write data (step S33).

When the fine write operation of the write data associated with the latest write command is finished, that is, all of the multi-step write operation of the entire write data is finished, the controller 4 returns a response indicating the command completion of the latest write command to the host 2 (step S34).

As described above, in the case of writing the write data to the write destination block by the multi-step write operation, in order to enable the second write operation step of the write data associated with the latest write command to be executed, the controller 4 writes the dummy data to one or more pages in this write destination block and advances a location of the write destination page in the write destination block where the next write data is to be written.

Figure 14:
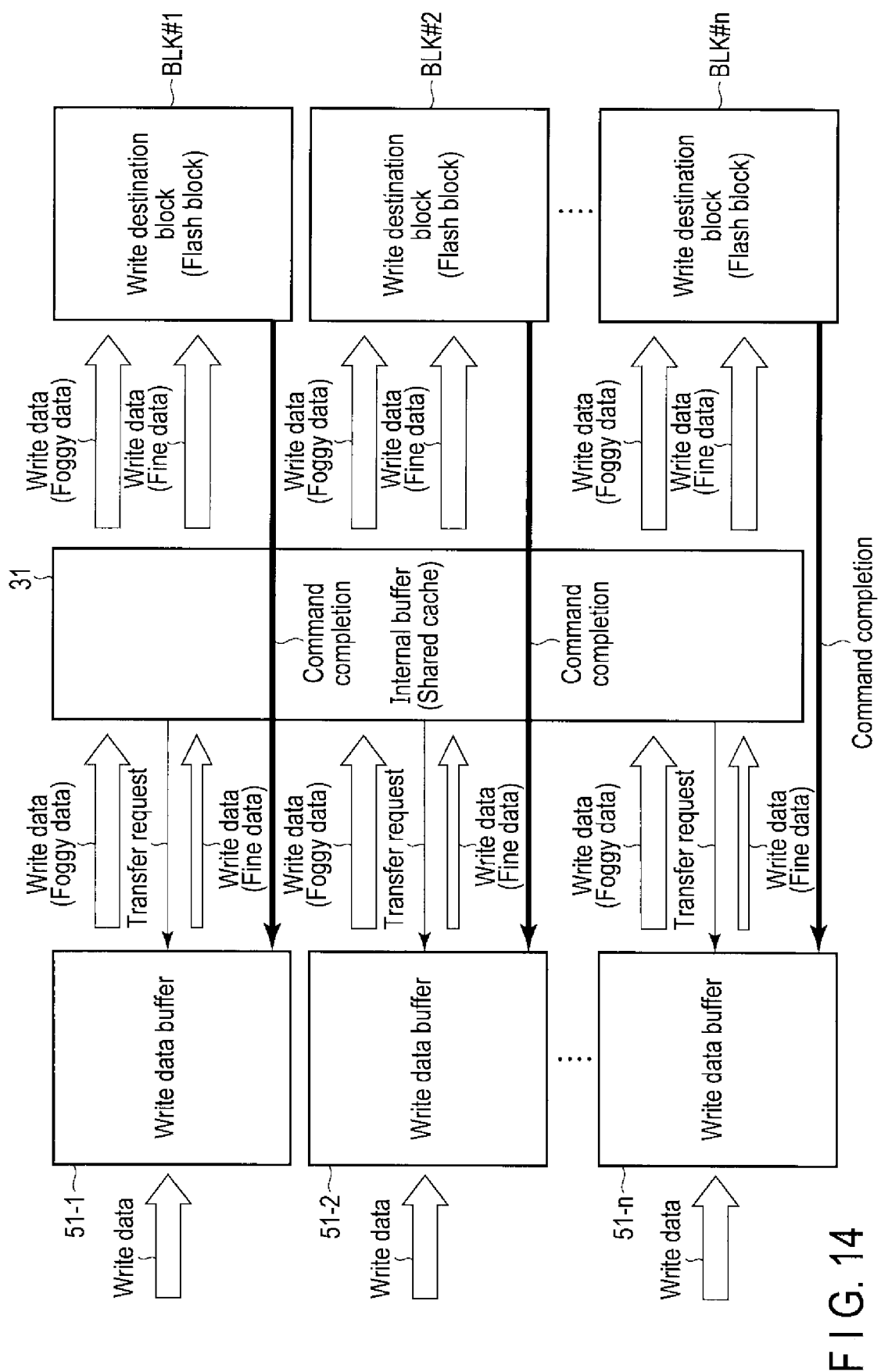
FIG. 14 is a block diagram illustrating a data transfer operation executed by the memory system according to the embodiment using an internal buffer.

FIG. 14 illustrates a data transfer operation executed by the controller 4 using the internal buffer (shared cache) 31.

The internal buffer (shared cache) 31 is shared by a plurality of write destination blocks BLK #1, BLK #2, ..., and BLK #n. The controller 4 of the flash storage device 3 executes the following processing for each of the write destination blocks BLK #1, BLK #2, ..., and BLK #n.

The write destination block BLK #1 will be described below by way of example.

After receiving one or more write commands designating the write destination block BLK #1, the controller 4 acquires, from the write data buffer 51, write data having the same size as the write unit of the NAND flash memory 5, which is obtained by dividing the write data associated with one write command designating the write destination block BLK #1 into a plurality of write data or combining the write data associated with the two or more write commands designating the write destination block BLK #1. In addition, the controller 4 stores a plurality of write data, each of which is obtained from the write data buffer 51 and has the same size as the write unit of the NAND flash memory 5, in the internal buffer (shared cache) 31.

The write data buffer 51 does not necessarily include one continuous region on the host memory. As illustrated in FIG. 14, the write data buffer 51 may be realized by a plurality of write data buffers 51-1, 51-2, ..., and 51-n.

The controller 4 acquires the write data (first write data) to be subsequently written to the write destination block BLK #1 from the internal buffer (shared cache) 31, transfers the first write data to the NAND flash memory 5, and writes the first write data to the write destination block BLK #1 by the first write operation step such as the foggy write operation.

In order to efficiently store the write data from the host 2 in the internal buffer (shared cache) 31, when there is no free region for storing write data acquired from the host 2 in the internal buffer (shared cache) 31, the controller 4 discards the write data (write data of a foggy state) in the internal buffer (shared cache) 31 in which the first write operation step such as the foggy write operation is finished and secures a free region in the internal buffer (shared cache) 31.

For example, when a new write command designating an arbitrary write destination block is received from the host 2 in a state in which there is no free region in the internal buffer (shared cache) 31, the controller 4 may discard the write data (write data of a foggy state) in the internal buffer (shared cache) 31 in which the first write operation step such as the foggy write operation is finished and secure a free region capable of storing write data corresponding to the new write command in the internal buffer (shared cache) 31.

For example, when a new write command is received from the host 2 in a state in which the entire internal buffer (shared cache) 31 is filled with a large amount of write data of a foggy state, the controller 4 may select specific write data to be discarded from the write data of the foggy state and discard the selected write data. As a result, it is possible to efficiently share the internal buffer (shared cache) 31 having the limited capacity between a plurality of write destination blocks.

In the case where the first write data does not exist in the internal buffer (shared cache) 31 at a point of time when the second write operation step such as the fine write operation of the first write data is to be executed, the controller 4 acquires the first write data again from the write data buffer 51 of the host 2 by sending a request (transfer request: DMA transfer request) for acquiring the first write data to the host 2. The acquired first write data may be stored in the internal buffer (shared cache) 31. In addition, the controller 4 transfers the acquired first write data to the NAND flash memory 5 and writes the first write data to the write destination block BLK #1 by the second write operation step such as the fine write operation.

In the case where the first write data exists in the internal buffer (shared cache) 31 at a point of time when the second write operation step such as the fine write operation of the first write data is to be executed, the controller 4 acquires the first write data from the internal buffer (shared cache) 31, transfers the acquired first write data to the NAND flash memory 5, and writes the first write data to the write destination block BLK #1 by the second write operation step such as the fine write operation.

After performing the final data transfer (here, data transfer for the fine write operation) of the first write data to the NAND flash memory 5, the controller 4 discards the first write data from the internal buffer (shared cache) 31, thereby securing a free region in the internal buffer (shared cache) 31. Alternatively, the controller 4 may discard the first write data from the internal buffer (shared cache) 31 when the fine write operation of the first write data is finished.

When all of the write operation for the entire write data associated with a certain write command is finished or when the fine write operation of the entire write data is finished and the entire write data becomes readable from the NAND flash memory 5, the controller 4 returns a response indicating the command completion of the write command to the host 2.

Although the internal buffer (shared cache) 31 has a limited capacity, if the number of write destination blocks is a certain number or less, the probability (hit rate) that the first write data exists in the internal buffer (shared cache) 31 at a point of time when the second write operation step for the first write data is to be executed is relatively high. Therefore, it is possible to execute the multi-step write operation such as the foggy-fine write operation without transferring the same write data from the host 2 to the flash storage device 3 multiple times. As a result, since data traffic between the host 2 and the flash storage device 3 can be reduced, I/O performance of the flash storage device 3 can be improved as compared with the case where the same write data is transferred from the host 2 to the flash storage device 3 multiple times each time data is written.

The number of write destination blocks may be the same as the number of clients using the host 2. In this case, data corresponding to a certain client is written to a write destination block corresponding to the client and data corresponding to another client is written to another write destination block. Therefore, when the number of clients using the host 2 increases, the hit ratio of the internal buffer (shared cache) 31 decreases. However, when the first write data does not exist in the internal buffer (shared cache) 31 (miss), the controller 4 acquires the first write data from the host 2. Therefore, even when the number of clients increases, it is possible to normally execute the multi-step write operation such as the foggy-fine write operation.

Therefore, the flash storage device 3 can flexibly cope with an increase in the number of clients sharing the flash storage device 3 (that is, an increase in the number of write destination blocks that can be simultaneously used) and the data traffic between the host 2 and the flash storage device 3 can be reduced.

Here, the write processing for writing data to the write destination block BLK #1 has been described. However, the same write processing is executed for each of the other write destination blocks.

Figure 15:
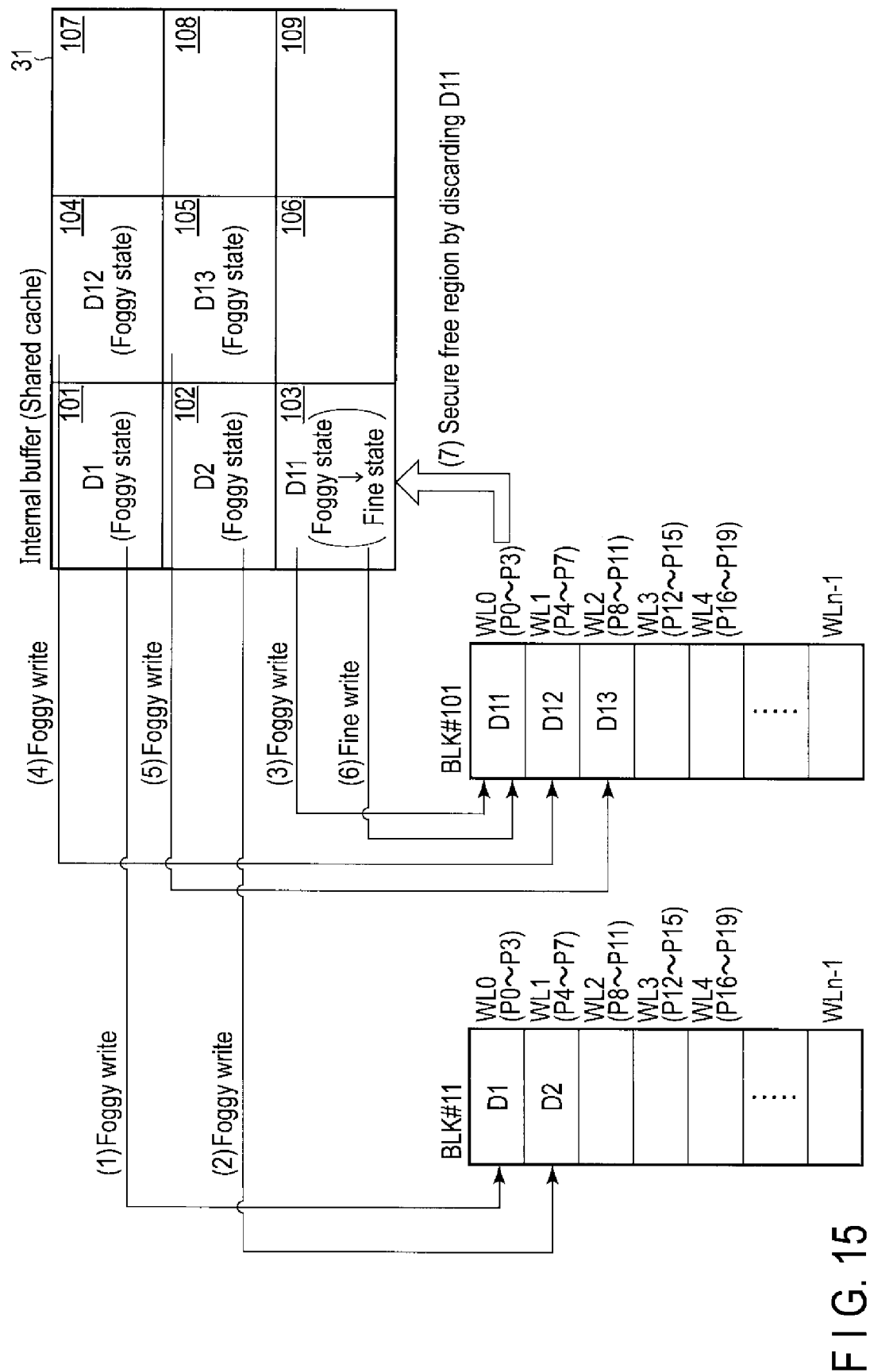
FIG. 15 is a diagram illustrating write processing executed by the memory system according to the embodiment using the internal buffer and processing for discarding write data in the internal buffer.

FIG. 15 illustrates the write processing executed by the controller 4 using the internal buffer (shared cache) 31 and processing for discarding the write data in the internal buffer (shared cache) 31.

In FIG. 15, for the sake of simplification of illustration, the case where the internal buffer (shared cache) 31 includes regions 101 to 109 is exemplified. Further, in FIG. 15, the NAND flash memory 5 is realized as a QLC-flash and processing for discarding the write data in a unit of a data size of four pages is exemplified. However, the present embodiment is not limited thereto. For example, processing for transferring the write data from the write data buffer 51 to the internal buffer (shared cache) 31 in a unit of a data size of one page may be executed and processing for discarding the write data in a unit of a data size of one page may be executed. Further, in FIG. 15, the case where the foggy-fine write operation is executed across three word lines WL is assumed.

Each of write data D1 and D2 respectively stored in the regions 101 and 102 of the internal buffer (shared cache) 31 is associated with one or more write commands designating the write destination block BLK #11. Each of the write data D1 and D2 may have, for example, a size of four pages. The controller 4 writes the write data D1 of four pages to pages P0 to P3 (a plurality of memory cells connected to the word line WL0) of the write destination block BLK #11 by the foggy write operation (1), and writes the write data D2 of four pages to pages P4 to P7 (a plurality of memory cells connected to the word line WL1) of the write destination block BLK #11 by the foggy write operation (2).

Each of write data D11, D12, and D13 respectively stored in the regions 103, 104, and 105 of the internal buffer (shared cache) 31 is associated with one or more write commands designating a write destination block BLK #101. Each of the write data D11, D12, and D13 may have, for example, a size of four pages. The controller 4 writes the write data D11 of four pages to the pages P0 to P3 (a plurality of memory cells connected to the word line WL0) of the write destination block BLK #101 by the foggy write operation (3), writes the write data D12 of four pages to the pages P4 to P7 (a plurality of memory cells connected to the word line WL1) of the write destination block BLK #101 by the foggy write operation (4), and writes the write data D13 of four pages to pages P8 to P11 (a plurality of memory cells connected to the word line WL2) of the write destination block BLK #101 by the foggy write operation (5).

After the foggy write operation of the write data D13 of four pages with respect to the word line WL2 of the write destination block BLK #101 is finished, the controller 4 writes the write data D11 of four pages to the pages P0 to P3 (a plurality of memory cells connected to the word line WL0) of the write destination block BLK #101 by the fine write operation (6). When the fine write operation of the write data D11 is finished or when the transfer (final transfer) for the fine write operation of the write data D11 to the NAND flash memory chip including the write destination block BLK #101 is finished, a state of the write data D11 changes from a foggy state to a fine state. Further, the controller 4 discards the write data D11 (write data of the fine state) in which the fine write operation has been finished from the internal buffer (shared cache) 31 to set the region 103 to a free region (7).

Figure 16:
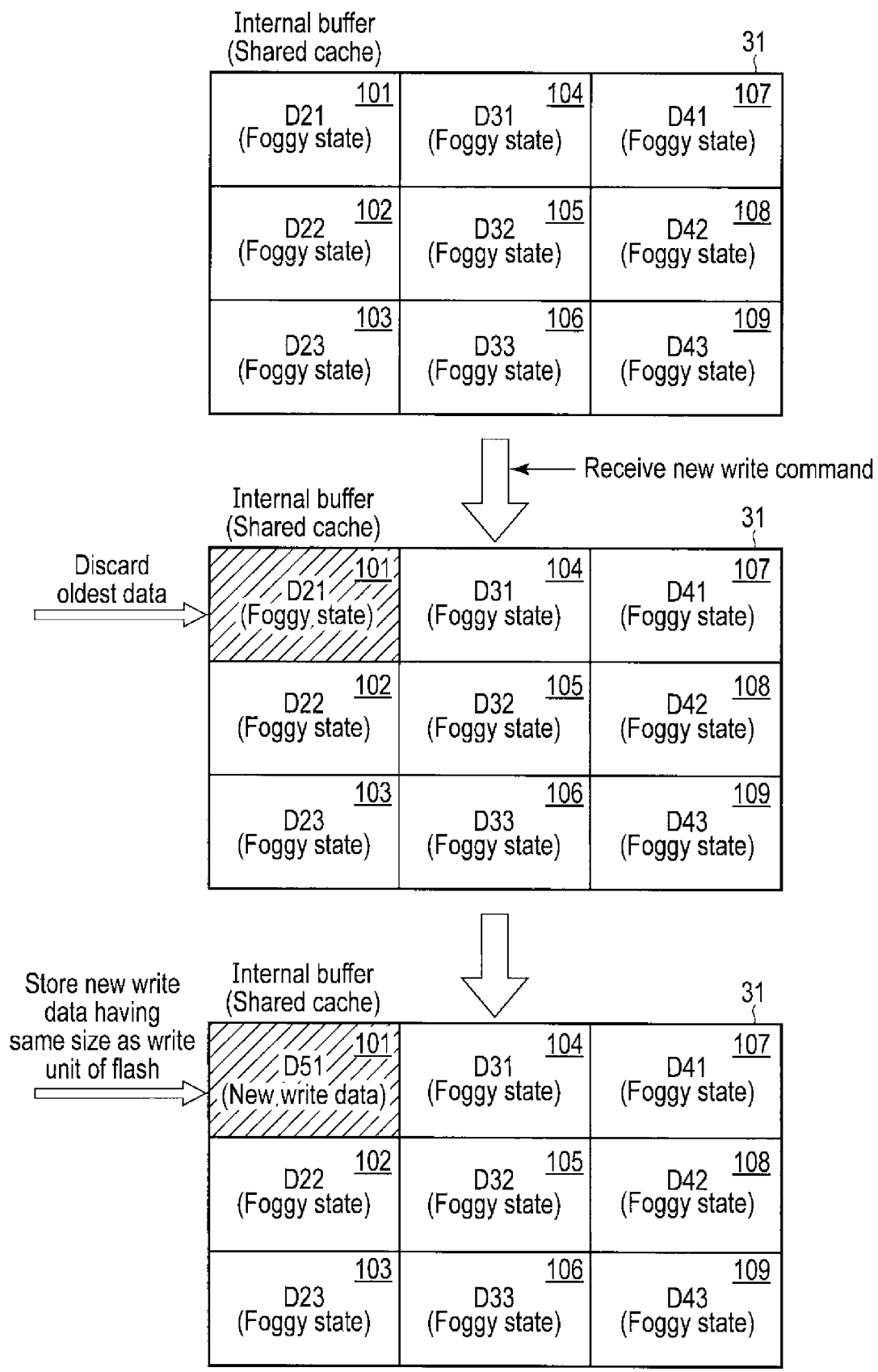
FIG. 16 is a diagram illustrating processing for discarding write data in the internal buffer, executed by the memory system according to the embodiment, when there is no free region in the internal buffer.

FIG. 16 illustrates processing for discarding the write data in the internal buffer (shared cache) 31, which is executed by the controller 4 when there is no free region in the internal buffer (shared cache) 31.

An upper portion of FIG. 16 illustrates a state in which the entire internal buffer (shared cache) 31 is filled with write data (D21 to D23, D31 to D33, and D41 to D43) of the foggy state in which the foggy write operation (first write operation step) is finished and there is no free region in the internal buffer (shared cache) 31.

In this state, when it is necessary to transfer the write data from the write data buffer 51 to the internal buffer (shared cache) 31, for example, when a new write command is received from the host 2, as illustrated in a middle portion of FIG. 16, the controller 4 selects the oldest write data (here, the write data D11) from the write data (write data of the foggy state) in which the foggy write operation (first write operation step) is finished as write data to be discarded and discards the oldest write data (here, the write data D11) from the internal buffer (shared cache) 31.

In addition, as illustrated in a lower portion of FIG. 16, the controller 4 of the flash storage device 3 stores new write data (here, write data D51) received from the write data buffer 51 in the region 101 that has become a free region by discarding the write data D11.

Instead of discarding the oldest write data among the write data (write data of the foggy state) in which the foggy write operation has been finished, the write data having the smallest number of remaining data transfers to the NAND flash memory 5 may be discarded among the write data (write data of the foggy state) in which the foggy write operation has been finished. In this case, for example, in the case where the multi-step write operation involving transferring the same data to the NAND flash memory 5 three times is used, data which has already been transferred twice to the NAND flash memory 5 is selected as data to be discarded in preference to data which has been transferred once to the NAND flash memory 5.

Figure 17:
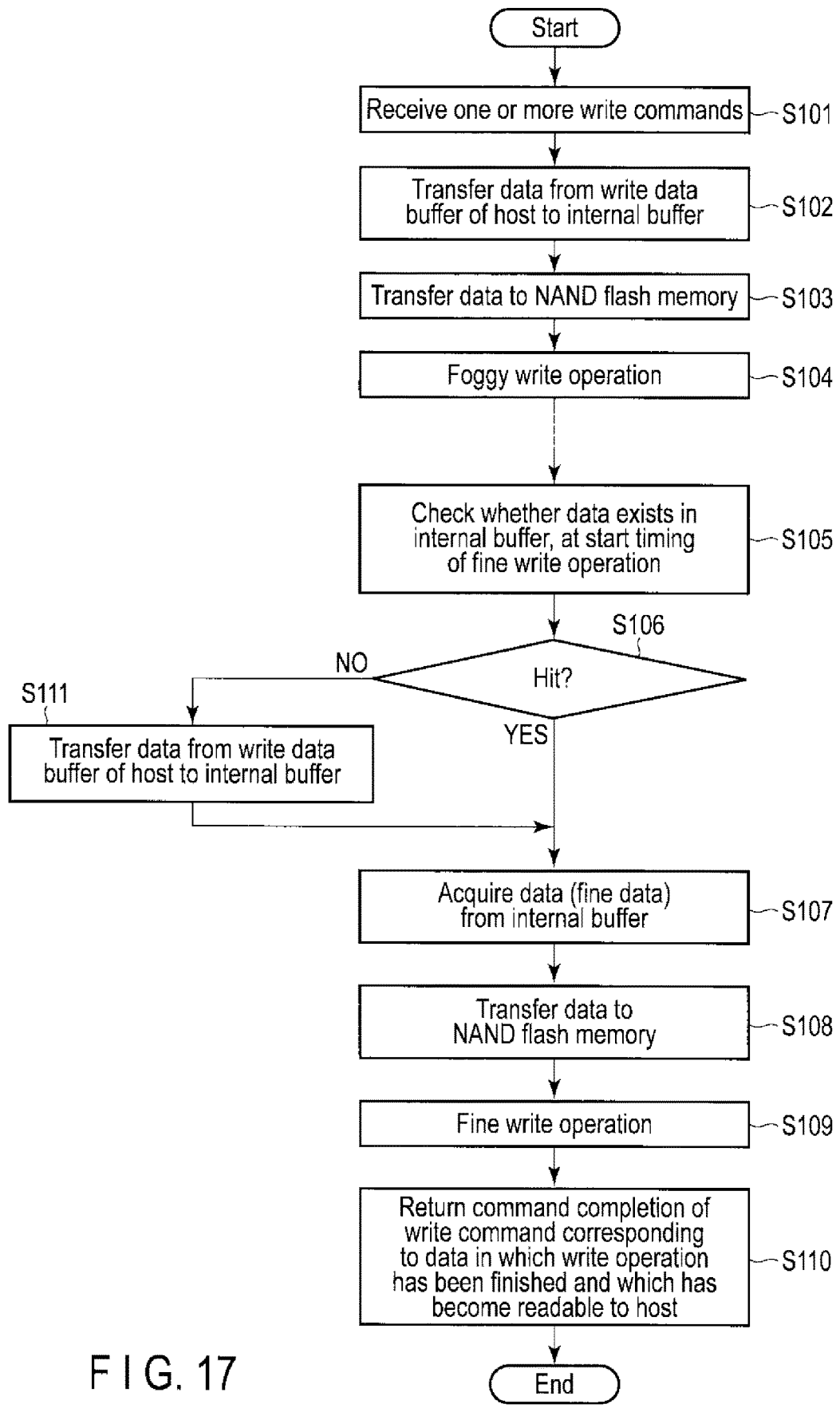
FIG. 17 is a flowchart illustrating a procedure of data write processing executed by the memory system according to the embodiment using the internal buffer.

A flowchart of FIG. 17 illustrates a procedure of data write processing executed by the controller 4 using the internal buffer (shared cache) 31.

The controller 4 receives one or more write commands each including a data pointer, a length of write data, and an identifier (for example, a block address) designating any one of a plurality of write destination blocks from the host 2 (step S101). After receiving one or more write commands having identifiers indicating the same write destination block, the controller 4 transfers write data having the same size as the write unit of the NAND flash memory 5, which is obtained by dividing the write data associated with one write command in the write commands into a plurality of write data or combining the write data associated with two or more write commands having the identifiers indicating the same write destination blocks, from the write data buffer 51 to the internal buffer (shared cache) 31 (step S102).

The controller 4 acquires the write data to be subsequently written to the write destination block from the internal buffer (shared cache) 31, transfers the write data to the NAND flash memory 5, and writes the write data to the write destination block by the foggy write operation (steps S103 and S104). When the NAND flash memory 5 is realized as a QLC-flash, in step S103, the write data of four pages is transferred to the NAND flash memory 5 in a page unit and in step S104, the write data of the four pages is written to a plurality of memory cells connected to one word line to be written in the write destination block by the foggy write operation.

The transfer of the write data from the write data buffer 51 to the internal buffer (shared cache) 31 is executed in accordance with the progress of the write operation of each write destination block. For example, when an operation of transferring the write data to be written to a certain page of a certain write destination block to the NAND flash memory chip is finished, write data to be written to a next page of the write destination block may be transferred from the write data buffer 51 to the internal buffer (shared cache) 31. Alternatively, when the operation of transferring the write data to be written to the certain page of the certain write destination block to the NAND flash memory chip including the write destination block is finished and the operation of writing the write data to the write destination block is finished, the write data to be written to the next page of the write destination block may be transferred from the write data buffer 51 to the internal buffer (shared cache) 31.

At a point of time when the fine write operation of the write data in which the foggy write operation has been finished is to be started, the controller 4 determines whether the write data exists in the internal buffer (shared cache) 31.

If the write data exists in the internal buffer (shared cache) 31 (YES in step S106), the controller 4 acquires the write data from the internal buffer (shared cache) 31, transfers the write data to the NAND flash memory 5, and writes the write data to the write destination block by the fine write operation (steps S107, S108, and S109). As a result, the write data becomes readable from the NAND flash memory 5.

The controller 4 determines whether the foggy-fine write operation of the entire write data has been finished and the entire write data has become readable from the NAND flash memory 5, for each write command. Then, the controller 4 returns, to the host 2, a response indicating the command completion of the write command corresponding to the write data in which the foggy-fine write operation has been finished and which has become readable from the NAND flash memory 5 (step S110). If the fine write operation of the entire write data associated with the certain write command has been finished by the processing of step S109, a response indicating the command completion of the write command may be returned to the host 2 in step S110.

If the write data does not exist in the internal buffer (shared cache) 31 (NO in step S106), the controller 4 acquires the write data from the write data buffer 51 on the host memory.

A flowchart of FIG. 18 illustrates a procedure of data read processing executed by the controller 4.

As described above, when the data designated by the read command received from the host 2 is data in which all of the write operation (write operation for transferring the same data to the NAND flash memory 5 once or more) has not been finished or data in which all of the write operation has been finished, but which has not yet become readable from the NAND flash memory 5, the controller 4 determines whether the data exists in the internal buffer (shared cache) 31. When the data does not exist in the internal buffer (shared cache) 31, the controller 4 acquires the data from the write data buffer 51, stores the data in the internal buffer (shared cache) 31, and returns the data from the internal buffer (shared cache) 31 to the host 2.

Specifically, the following data read processing is executed.

When the controller 4 receives the read command from the host 2 (YES in step S121), the controller 4 determines whether the data designated by the read command is data in which all of the write operation is finished and which is readable from the NAND flash memory 5 (step S122).

When the data designated by the read command is readable from the NAND flash memory 5 (YES in step S122), the controller 4 reads the data from the NAND flash memory 5 and returns the read data to the host 2 (step S126). In step S126, the controller 4 transfers the read data to a location in the read data buffer 53 designated by the data pointer included in the read command.

When the data designated by the read command is not readable from the NAND flash memory 5 (NO in step S122), the controller 4 determines whether the data exists in the internal buffer (shared cache) 31 (step S123).

When the data designated by the read command exists in the internal buffer (shared cache) 31 (YES in step S123), the controller 4 reads the data from the internal buffer (shared cache) 31 and returns the read data to the host 2 (step S124). In step S124, the controller 4 transfers the read data to a location in the read data buffer 53 designated by the data pointer included in the read command.

When the data does not exist in the internal buffer (shared cache) 31 (NO in step S123), the controller 4 acquires the data from the write data buffer 51 and stores the data in the internal buffer (shared cache) 31 (step S125). In step S125, the data is transferred from the write data buffer 51 to a free region of the internal buffer (shared cache) 31 by the DMAC 15. When there is no free region of the internal buffer (shared cache) 31, processing for securing the free region of the internal buffer (shared cache) 31 is executed. In addition, the controller 4 reads the data from the internal buffer (shared cache) 31 and returns the read data to the host 2 (step S124). In step S124, the controller 4 transfers the read data to a location in the read data buffer 53 designated by the data pointer included in the read command.

FIG. 19 illustrates a data write operation and a data read operation to be applied to the flash storage device 3 realized as the type #2-storage device.

In the data write operation, the host 2 designates a write destination block and the flash storage device 3 determines a write destination page. In addition, in the data read operation, the host 2 designates a block address and a page address.

The host 2 includes a storage management unit 404 for managing the flash storage device 3. The storage management unit 404 sends a block allocation command and a write command to the flash storage device 3.

The controller 4 of the flash storage device 3 includes a block allocation unit 701 and a page allocation unit 702. The block allocation unit 701 and the page allocation unit 702 may be included in the write control unit 21 described in FIG. 2.

The data write operation is executed in the following procedure.

(1) When the storage management unit 404 of the host 2 needs to write data (write data) to the flash storage device 3, the storage management unit 404 may request the flash storage device 3 to allocate an available free block as a write destination block. When the block allocation unit 701 receives the request (block allocation command), the block allocation unit 701 allocates one free block of a free block group as the write destination block to the host 2 and notifies the host 2 of a block address (BLK #) of the allocated write destination block.

(2) The storage management unit 404 of the host 2 sends a write command including the block address designating the allocated write destination block, a tag for identifying the write data, a data length of the write data, and a data pointer to the flash storage device 3. In addition, the storage management unit 404 stores the write data in the write data buffer 51.

(3) When the page allocation unit 702 receives the write command, the page allocation unit 702 determines a page address indicating a write destination page in a block (write destination block) having the block address designated by the write command. The controller 4 transfers the write data from the write data buffer 51 to the internal buffer (shared cache) 31 in a unit of a page size and writes the write data to the determined write destination page in the write destination block.

(4) The controller 4 may notify the host 2 of the page address indicating the write destination page as a response indicating the command completion of the write command. Alternatively, the controller 4 may notify the host 2 of a set of the tag included in the write command, the block address included in the write command, and the determined page address as the response indicating the command completion of the write command. In the host 2, the LUT 404A is updated so that a physical address (the block address and the page address) indicating a physical storage location where the write data has been written is mapped to the tag of the write data.

The data read operation is executed in the following procedure.

(1)' When the host 2 needs to read data from the flash storage device 3, the host 2 refers to the LUT 404A to acquire from the LUT 404A the physical address (the block address and the page address) corresponding to the tag of the data to be read.

(2)' The host 2 sends a read command designating the acquired block address and page address to the flash storage device 3. When the controller 4 of the flash storage device 3 receives the read command from the host 2, the controller 4 reads the data from the physical storage location of the read target in the block to be read, based on the block address and the page address.

FIG. 20 illustrates a block allocation command applied to the flash storage device 3 realized as the type #2-storage device.

The block allocation command is a command (block allocation request) that requests the flash storage device 3 to allocate a write destination block (free block). The host 2 requests the flash storage device 3 to allocate the write destination block by transmitting the block allocation command to the flash storage device 3, thereby obtaining the block address (block address of the allocated write destination block).

FIG. 21 illustrates a response to the block allocation command.

When the block allocation command is received from the host 2, the controller 4 of the flash storage device 3 selects the free block to be allocated to the host 2 from a free block list, allocates the selected free block as the write destination block, and returns a response including the block address of the write destination block to the host 2.

FIG. 22 illustrates a write command applied to the flash storage device 3 realized as the type #2-storage device.

The write command is a command for requesting the flash storage device 3 to write data. The write command may include a command ID, a block address, a tag, a length, and the like.

The command ID is an ID (command code) indicating that a command is a write command and the write command includes the command ID for the write command.

The block address is a physical address designating a write destination block where data is to be written.

The tag is an identifier for identifying write data to be written. As described above, the tag may be a logical address such as the LBA and may be a key of a key-value store. When the tag is the logical address such as the LBA, the logical address (start LBA) included in the write command indicates a logical location (first logical location) in a logical address space where the write data is to be written.

The length indicates a length of the write data to be written.

The write command further includes a data pointer indicating a location in the write data buffer 51 in which the write data has been stored.

When the write command is received from the host 2, the controller 4 determines a write destination location (write destination page) in the write destination block having the block address designated by the write command. The write destination page is determined in consideration of page write order restrictions, bad pages, and the like. In addition, the controller 4 writes the write data associated with the write command to the write destination location (write destination page) in the write destination block.

FIG. 23 illustrates a response to the write command of FIG. 22.

The response includes the page address and the length. The page address is a physical address indicating the physical storage location in the write destination block where the data has been written. The physical address may be represented by an offset in the block (that is, a set of a page address and an offset in a page). The length indicates a length of the written data.

Alternatively, the response may further include a tag and a block address, in addition to the page address (offset in the block) and the length. The tag is the tag included in the write command of FIG. 22. The block address is the block address included in the write command of FIG. 22.

FIG. 24 illustrates a read command applied to the flash storage device 3 realized as the type #2-storage device.

The read command is a command for requesting the flash storage device 3 to read data. The read command includes a command ID, a tag, a block address, a page address, and a length.

The command ID is an ID (command code) indicating that a command is a read command and the read command includes the command ID for the read command.

The block address designates a block where data to be read is stored. The page address designates a page where the data to be read is stored. The page address may be represented by an offset in the block (that is, a set of a page address and an offset in a page), which indicates a physical storage location in the block where the data to be read is stored. The length indicates a length of the data to be read.

Further, the read command includes a data pointer indicating a location in the read data buffer 53 to which the data designated by the read command is to be transferred.

As described above, according to the present embodiment, after receiving one or more write commands having the first identifiers indicating the same write destination block, the controller 4 acquires, from the host 2, write data having the same size as the data write unit of the NAND flash memory 5, which is obtained by dividing the write data associated with one write command in the received write command into a plurality of write data (a plurality of data portions) or combining the write data associated with the two or more write commands in the received write command. In addition, the controller 4 writes the acquired write data to the write destination block designated by the first identifier, by the first write operation involving transferring the same data once or more.

Therefore, the write data can be acquired from the host 2 in a unit of the same data size as the data write unit of the NAND flash memory 5, regardless of the size of the write data designated by each write command, and the write data can be transferred to the NAND flash memory 5. Therefore, even if a write command requesting writing of large-sized write data to a certain write destination block is received, it is possible to prevent stagnation of a data write operation for other write destination block due to this. Therefore, it is possible to efficiently process each of the plurality of write commands respectively designating the plurality of write destination blocks. As a result, even if the internal buffer 31 with the large capacity is not provided on the device side or the buffer-less configuration where the capacity of the internal buffer 31 is nearly zero is used, the plurality of write destination blocks can be simultaneously used.

That is, as described above, by diverting the host memory (write data buffer 51) on the device side, it is possible to flexibly cope with an increase in the number of write destination blocks, that is, an increase in the number of clients sharing the flash storage device 3, without providing the internal buffer 31 with the large capacity on the device side, and with the limited resources of the flash storage device 3, it is possible to maximize the upper limit of the number of write destination blocks that can be simultaneously used.

In addition, when all of the write operation (write operation for transferring the same data to the NAND flash memory 5 once or more) for the entire write data associated with one write command designating the certain write destination block is finished or when all of the write operation (write operation involving transferring the same data to the NAND flash memory 5 once or more) for the entire write data associated with one write command designating the certain write destination block is finished and the entire write data becomes readable from the NAND flash memory 5, the controller 4 returns a response indicating the command completion of the write command to the host 2.

As a result, the host 2 performs only simple processing for discarding the write data corresponding to the write command of which the command completion has been given in notification, from the write data buffer 51, thereby maintaining the write data in the write data buffer 51 until the write data of each write command becomes readable.

Further, at a point of time when the second write operation step such as the fine write operation is to be executed, only when there is no data to be written in the internal buffer 31, the controller 4 transfers the write data again from the write data buffer 51 of the host 2 to the internal buffer 31. Therefore, it becomes unnecessary to transfer the same data from the write data buffer 51 to the internal buffer 31 multiple times every time the data is written. As described above, by diverting the write data buffer 51 of the host 2 on the device side, it is possible to flexibly cope with an increase in the number of write destination blocks, that is, an increase in the number of clients sharing the flash storage device 3, without providing the internal buffer 31 with the large capacity on the device side for the multi-step write operation, and it is possible to reduce data traffic between the host 2 and the flash storage device 3.

Further, in the configuration of the present embodiment, instead of returning the response of the command completion to the host 2 when the write data having the size designated by each write command is transferred from the host 2 to the flash storage device 3 and the transfer of the write data is finished, the write data is transferred from the host 2 to the flash storage device 3 in a unit of the same size as the write unit of the flash and the response of the command completion is returned to the host 2 for each write command. Therefore, it is possible to flexibly cope with an increase in the number of write destination blocks, that is, an increase in the number of clients sharing the flash storage device 3 while using a standard such as NVMe.

The write data buffer 51 can be realized as a region accessible from each virtual machine executed on the host 2. In the case where the host 2 and the flash storage device 3 are connected via a network such as Ethernet, the DMA transfer between the write data buffer 51 and the internal buffer 31 may be executed by remote DMA transfer.

Further, in the present embodiment, the NAND flash memory is exemplified as the nonvolatile memory. However, the functions of the present embodiment can be applied to a variety of other nonvolatile memories such as a magnetoresistive random access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the host including a buffer, the memory system comprising:
   a nonvolatile memory including a plurality of blocks, a first block among the plurality of blocks including a first word line and a second word line, a data write operation to the nonvolatile memory being performed in a unit of a first size; and a controller electrically connected to the nonvolatile memory and configured to:
in response to receiving, from the host, a first write command:
- at a first timing, transfer first write data from the buffer of the host to the nonvolatile memory, a size of the first write data being equal to the first size;
- at a second timing after the first timing, instruct the nonvolatile memory to write the first write data into memory cells connected to the first word line;
- at a third timing after the second timing, transfer second write data from the buffer of the host to the nonvolatile memory, a size of the second write data being equal to the first size;
- at a fourth timing after the third timing, instruct the nonvolatile memory to write the second write data into memory cells connected to the second word line; and
- at a fifth timing after the fourth timing, instruct the nonvolatile memory to write the first write data into the memory cells connected to the first word line again.

2. The memory system according to claim 1, wherein
the first write data is not readable from the nonvolatile memory between the second timing and the fifth timing, and
the first write data is readable from the nonvolatile memory after the fifth timing.

3. The memory system according to claim 1, wherein
the nonvolatile memory is configured to:
at the second timing, write the first write data into the memory cells connected to the first word line by a first programming method;
at the fourth timing, write the second write data into the memory cells connected to the second word line by the first programming method; and
at the fifth timing, write the first write data into the memory cells connected to the first word line by a second programming method, the second programming method being different from the first programming method.

4. The memory system according to claim 1, further comprising an internal buffer, wherein
the controller is further configured to:
between the first timing and the second timing, store the first write data into the internal buffer;
between the third timing and the fourth timing, store the second write data into the internal buffer; and
at a sixth timing between the fourth timing and the fifth timing, in a case that the first write data is no longer stored in the internal buffer:
transfer the first write data from the buffer of the host again,
store the first write data into the internal buffer again, and
transfer the first write data from the internal buffer to the nonvolatile memory again.

5. The memory system according to claim 1, further comprising an internal buffer, wherein
the controller is further configured to:
between the first timing and the second timing, store the first write data into the internal buffer;
between the third timing and the fourth timing, store the second write data into the internal buffer; and
at a sixth timing between the fourth timing and the fifth timing, in a case that the first write data is still stored in the internal buffer,
transfer the first write data from the internal buffer to the nonvolatile memory again without transferring the first write data from the buffer of the host again.

6. The memory system according to claim 1, further comprising an internal buffer, wherein
the controller is further configured to:
between the first timing and the second timing, store the first write data into the internal buffer;
between the third timing and the fourth timing, store the second write data into the internal buffer; and
at a sixth timing between the fourth timing and the fifth timing, in a case that the first write data is no longer stored in the internal buffer and a first read command is received from the host that requests to read the first write data,
transfer the first write data from the buffer of the host again,
store the first write data into the internal buffer again, and
transfer the first write data from the internal buffer to the host.

7. The memory system according to claim 1, wherein
the first write data includes a plurality of pieces of write data, the plurality of pieces of write data being respectively associated with a plurality of write commands including the first write command, and
a size of each of the plurality of pieces of write data is smaller than the first size.

8. The memory system according to claim 1, further comprising an internal buffer, wherein
the controller is configured to:
transfer each of the first write data and the second write data from the buffer of the host to the nonvolatile memory via the internal buffer.

9. The memory system according to claim 1, wherein
the first write command includes an identifier of the first block, and
the controller is further configured to, in response to receiving, from the host, a command that requests to allocate an available block for the host, allocate the first block from the plurality of blocks for the host and notify the host of the identifier of the first block.

10. The memory system according to claim 1, wherein
the first block further includes a third word line, and
the controller is further configured to:
at a sixth timing, receive a second write command that requests to write third write data, a size of the third write data being smaller than the first size; and
upon detecting that a threshold time period has elapsed from the sixth timing, transfer the third write data along with dummy write data to the nonvolatile memory, a size of a total of the third write data and the dummy write data being equal to the first size.

11. A method of controlling a nonvolatile memory, the nonvolatile memory including a plurality of blocks, a first block among the plurality of blocks including a first word line and a second word line, a data write operation to the nonvolatile memory being performed in a unit of a first size, the method comprising:
in response to receiving, from a host, a first write command:
at a first timing, transferring first write data from a buffer of the host to the nonvolatile memory, a size of the first write data being equal to the first size;
at a second timing after the first timing, instructing the nonvolatile memory to write the first write data into memory cells connected to the first word line;

at a third timing after the second timing, transferring second write data from the buffer of the host to the nonvolatile memory, a size of the second write data being equal to the first size;

at a fourth timing after the third timing, instructing the nonvolatile memory to write the second write data into memory cells connected to the second word line; and at a fifth timing after the fourth timing, instructing the nonvolatile memory to write the first write data into the memory cells connected to the first word line again.

12. The method according to claim 11, wherein
the first write data is not readable from the nonvolatile memory between the second timing and the fifth timing, and
the first write data is readable from the nonvolatile memory after the fifth timing.

13. The method according to claim 11, further comprising:
at the second timing, instructing the nonvolatile memory to write the first write data into the memory cells connected to the first word line by a first programming method;
at the fourth timing, instructing the nonvolatile memory to write the second write data into the memory cells connected to the second word line by the first programming method; and
at the fifth timing, instructing the nonvolatile memory to write the first write data into the memory cells connected to the first word line by a second programming method, the second programming method being different from the first programming method.

14. The method according to claim 11, further comprising:
between the first timing and the second timing, storing the first write data into an internal buffer that is outside of the host;
between the third timing and the fourth timing, storing the second write data into the internal buffer; and
at a sixth timing between the fourth timing and the fifth timing, in a case that the first write data is no longer stored in the internal buffer:
transferring the first write data from the buffer of the host again,
storing the first write data into the internal buffer again, and
transferring the first write data from the internal buffer to the nonvolatile memory again.

15. The method according to claim 11, further comprising:
between the first timing and the second timing, storing the first write data into an internal buffer that is outside of the host;
between the third timing and the fourth timing, storing the second write data into the internal buffer; and
at a sixth timing between the fourth timing and the fifth timing, in a case that the first write data is still stored in the internal buffer,
transferring the first write data from the internal buffer to the nonvolatile memory again without transferring the first write data from the buffer of the host again.

16. The method according to claim 11, further comprising:
between the first timing and the second timing, storing the first write data into an internal buffer that is outside of the host;
between the third timing and the fourth timing, storing the second write data into the internal buffer; and
at a sixth timing between the fourth timing and the fifth timing, in a case that the first write data is no longer stored in the internal buffer and a first read command is received from the host that requests to read the first write data:
transferring the first write data from the buffer of the host again,
storing the first write data into the internal buffer again, and
transferring the first write data from the internal buffer to the host.

17. The method according to claim 11, wherein
the first write data includes a plurality of pieces of write data, the plurality of pieces of write data being respectively associated with a plurality of write commands including the first write command, and
a size of each of the plurality of pieces of write data is smaller than the first size.

18. The method according to claim 11, further comprising:
transferring each of the first write data and the second write data from the buffer of the host to the nonvolatile memory via an internal buffer that is outside of the host.

19. The method according to claim 11, wherein
the first write command includes an identifier of the first block, and the method further comprises:
in response to receiving, from the host, a command that requests to allocate an available block for the host, allocating the first block from the plurality of blocks for the host and notifying the host of the identifier of the first block.

20. The method according to claim 11, wherein
the first block further includes a third word line, and the method further comprises:
at a sixth timing, receiving a second write command that requests to write third write data, a size of the third write data being smaller than the first size; and
upon detecting that a threshold time period has elapsed from the sixth timing, transferring the third write data along with dummy write data to the nonvolatile memory, a size of a total of the third write data and the dummy write data being equal to the first size.

* * * * *